(12) United States Patent
Dieterich

(10) Patent No.: US 7,006,151 B2
(45) Date of Patent: Feb. 28, 2006

(54) VIDEO STREAMS FOR CLOSED CAPTION TESTING AND THE LIKE

(75) Inventor: Charles B. Dieterich, Kingston, NJ (US)

(73) Assignee: Sarnoff Corporation, Princeton, NJ (US)

( * ) Notice: Subject to any disclaimer, the term of this patent is extended or adjusted under 35 U.S.C. 154(b) by 525 days.

(21) Appl. No.: 10/124,337

(22) Filed: Apr. 17, 2002

(65) Prior Publication Data

US 2002/0154220 A1    Oct. 24, 2002

Related U.S. Application Data

(60) Provisional application No. 60/284,600, filed on Apr. 18, 2001, provisional application No. 60/284,601, filed on Apr. 18, 2001.

(51) Int. Cl.
*H04N 5/45*    (2006.01)
(52) U.S. Cl. .................... 348/565; 348/184; 348/468
(58) Field of Classification Search .............. 348/565, 348/568, 468, 569, 180, 184, 185, 189, 564; 702/66, 67, 69, 71, 74
See application file for complete search history.

(56) References Cited

U.S. PATENT DOCUMENTS

| | | | |
|---|---|---|---|
| 4,550,407 A | | 10/1985 | Couasnon et al. |
| 4,725,888 A | * | 2/1988 | Hakamada ................. 348/565 |
| 4,746,983 A | * | 5/1988 | Hakamada ................. 348/565 |
| 4,777,531 A | * | 10/1988 | Hakamada et al. ......... 348/565 |
| 4,845,564 A | * | 7/1989 | Hakamada et al. ......... 348/565 |
| 5,111,297 A | * | 5/1992 | Tsuji et al. ................. 348/565 |
| 6,088,064 A | | 7/2000 | Rumreich et al. |
| 6,108,042 A | | 8/2000 | Adams et al. |

* cited by examiner

*Primary Examiner*—Victor R. Kostak
(74) *Attorney, Agent, or Firm*—William J. Burke

(57) ABSTRACT

A data structure, such as a digital television signal, includes (a) a video stream representing a picture and (b) auxiliary information, such as a closed caption stream. In one embodiment, the picture has an inset window representative of a reduced version of the picture properly overlaid by the auxiliary information. In another embodiment, the data structure has two or more auxiliary information streams, and the picture is used to independently test the auxiliary information processing of each of the auxiliary information streams.

22 Claims, 25 Drawing Sheets

VIDEO STREAMS FOR CLOSED CAPTION TESTING AND THE LIKE

CROSS-REFERENCE TO RELATED APPLICATIONS

This application claims the benefit of the filing dates of U.S. provisional application No. 60/284,600, filed on Apr. 18, 2001 and U.S. provisional application No. 60/284,601, filed on Apr. 18, 2001.

BACKGROUND OF THE INVENTION

1. Field of the Invention

The present invention relates to video processing, and, in particular, to testing the closed caption processing of televisions and other video playback devices.

2. Description of the Related Art

Closed captioning (CC) refers to the display of alphanumeric characters over the video content of a television or other video signal when rendered on a display (e.g., a television set or a computer monitor). Electronics Industries Alliance standard EIA-608 specifies requirements for embedding CC data into analog television signals. In order to determine whether conventional analog television sets are capable of proper processing of CC data, special sequences of analog television signals have been developed to verify proper closed caption processing with regard to such characteristics as the location of the CC window on the video display, the individual characters presented in the CC window, and the colors of both the characters (i.e., foreground color) and the window itself (i.e., background color).

The EIA-708-B standard specifies requirements for embedding CC data into digital television signals (i.e., DTV bitstreams). The Consumer Electronics Association (CEA) R4.3 Television Data Systems Subcommittee Working Group 1 on DTV Closed Captioning describes special DTV bitstreams for testing the closed captioning interpretation of DTV television sets and other DTV decoder.

FIG. 1 shows a block diagram of a system 100 for testing the closed caption processing of a device under test (DUT), e.g., a digital television set. As shown in FIG. 1, a bitstream source 102 provides a special DTV test bitstream with embedded CC data to DUT 104, which processes the test bitstream to generate test image data for display on display device 106, where the test image data corresponds to the video portion of the DTV signal overlaid with the closed caption portion. An observer determines whether DUT 104 is properly processing (i.e., interpreting) the CC data by viewing the test images 108 rendered on display device 106.

Bitstream source 102 may be a computer or other processor having a test bitstream stored in a memory or storage device therein or may simply be a reader of a test bitstream stored on a storage medium, such as a floppy disk, magnetic tape, a compact disk (CD), digital video disk (DVD), or other storage medium. Source 102 may also be a processor that receives test images in either analog or digital format and codes such images to form the test bitstream. In any case, DUT 104 decodes the test bitstream in accordance with the decoding circuitry and/or software and/or algorithms therein, and produces there from test image data that is applied to a display device 106, such as a television receiver, television monitor, computer display, or other visual display, to produce test images 108 thereon.

FIG. 2A shows an exemplary test image 200A generated on display device 106 during closed caption testing as specified by the CEA R4.3 working group. Test image 200A has two associated video windows 202 and 204, where the closed caption content is rendered over video window 202, and video content representative of the closed caption content is displayed in video window 204. In test image 200A, the individual CC character blocks 206 are represented by closed caption data encoded in the input DTV bitstream, while the rest of the display is part of the video data encoded in the input DTV bitstream. FIG. 2B shows the corresponding test image 200B when closed caption processing is turned off. Test image 200B of FIG. 2B is identical to test image 200A of FIG. 2A, except that, instead of displaying CC character blocks 206 within video window 202, test image 200B shows the video imagery that would otherwise be overwritten by the CC character blocks. During closed caption testing, the observer determines whether DUT 104 is operating properly by verifying that the closed caption characters in video window 202 match the video characters in video window 204. While the content in video window 204 is intended to represent the CC characters, there is no attempt to represent those characters using the same font or the same color as the CC characters. Nor is the position of CC character blocks 206 in the test image represented in the video content.

The closed caption testing specified by the CEA R4.3 working group for DTV bitstreams is directed to the same types of characteristics as the conventional closed caption testing of analog television signals.

SUMMARY OF THE INVENTION

Certain embodiments of the present invention are directed to closed caption testing techniques that improve on conventional closed caption testing for analog and/or digital television signals.

According to one embodiment, the present invention is a data structure (and a method for generating such a data structure) for testing auxiliary information processing of a decoder, wherein the data structure comprises (a) a video stream comprising a coded representation of a picture; and (b) an auxiliary information stream comprising a coded representation of auxiliary information for the picture, wherein the picture comprises an inset window representative of a reduced version of the picture properly overlaid by the auxiliary information.

According to another embodiment, the present invention is a data structure (and a method for generating such a data structure) for testing auxiliary information processing of a decoder, wherein the data structure comprises (a) a video stream comprising a coded representation of a picture; and (b) two or more auxiliary information streams, each comprising a coded representation of auxiliary information for the picture, wherein the picture is used to independently test the auxiliary information processing of each of the auxiliary information streams.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 2A shows an exemplary test image generated on the display device of the system of FIG. 1 during the closed caption testing specified by the CEA R4.3 working group, while

FIG. 3A shows an exemplary test image of the present invention having closed caption (CC) character blocks and a video inset window that represents a reduced version of the test image, while

FIGS. 13A–13F show a sequence in which the caption processing lags the video of FIGS. 11A–11F by a two-frame delay, while

DETAILED DESCRIPTION

According to certain embodiments of the present invention, a set of recorded MPEG transport streams (i.e., test bitstreams) conforming to ATSC standards are used to test closed captioning interpretation in a DTV television set or other DTV decoder. In alternative embodiments, test bitstreams conforming to standards other than ATSC may be used for other types of video decoders, including analog as well as digital video standards and decoders. Although preferably provided on CD-ROM or DVD-ROM as ATSC-compliant transport bitstreams designed to be played under test by an ATSC player-modulator, the test bitstreams may alternatively be provided via any other suitable means.

Video Inset Window

According to this feature of the present invention, the video portion of a test bitstream for closed caption testing contains an inset window that represents the entire display that would be generated with proper closed caption processing.

Figure 1:
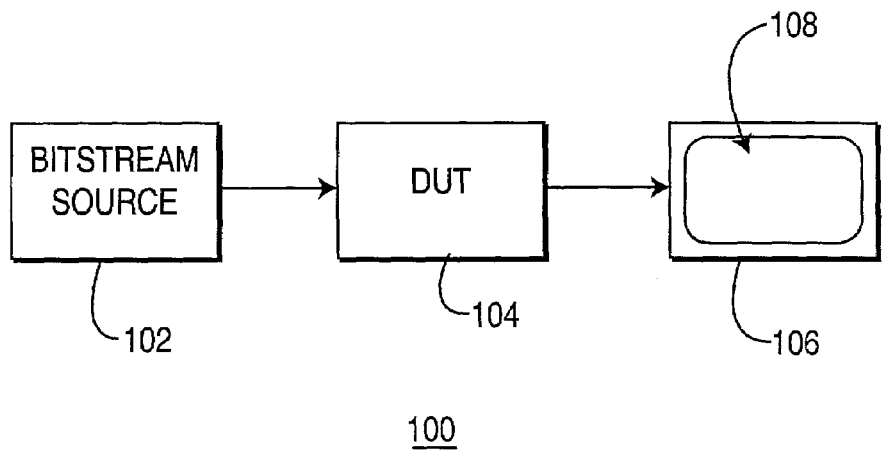
FIG. 1 shows a block diagram of a system for testing the closed caption processing of a device under test (DUT), e.g., a digital television set.
Figure 2A:
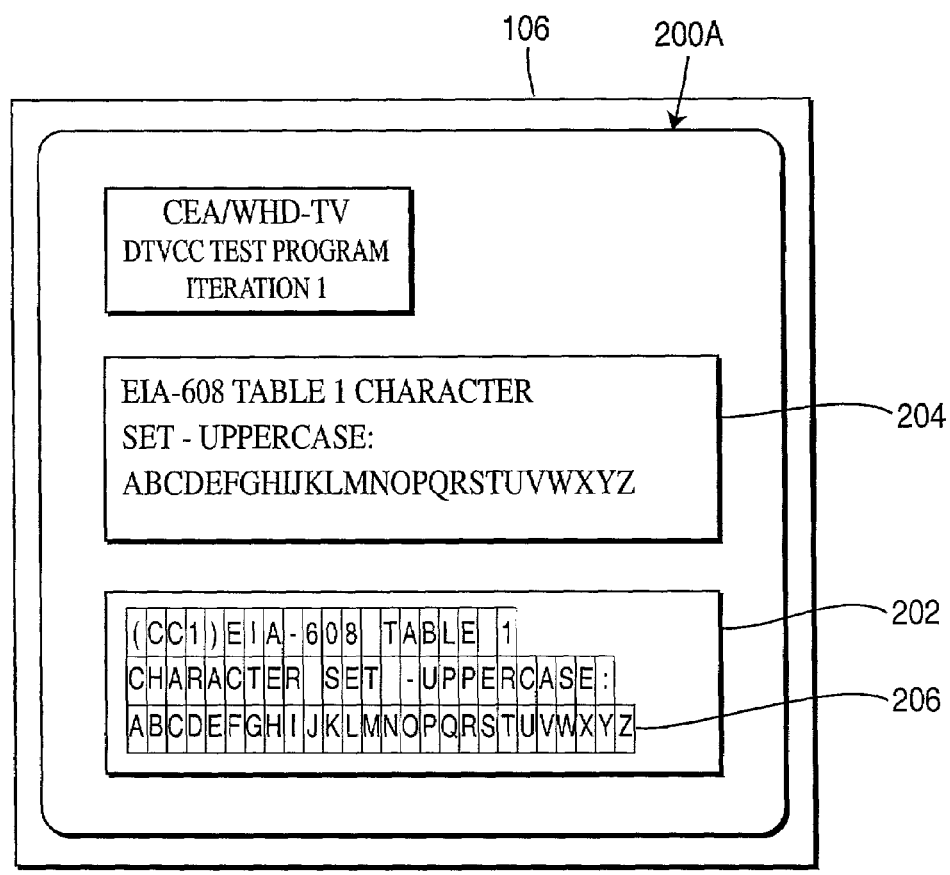
Figure 2B:
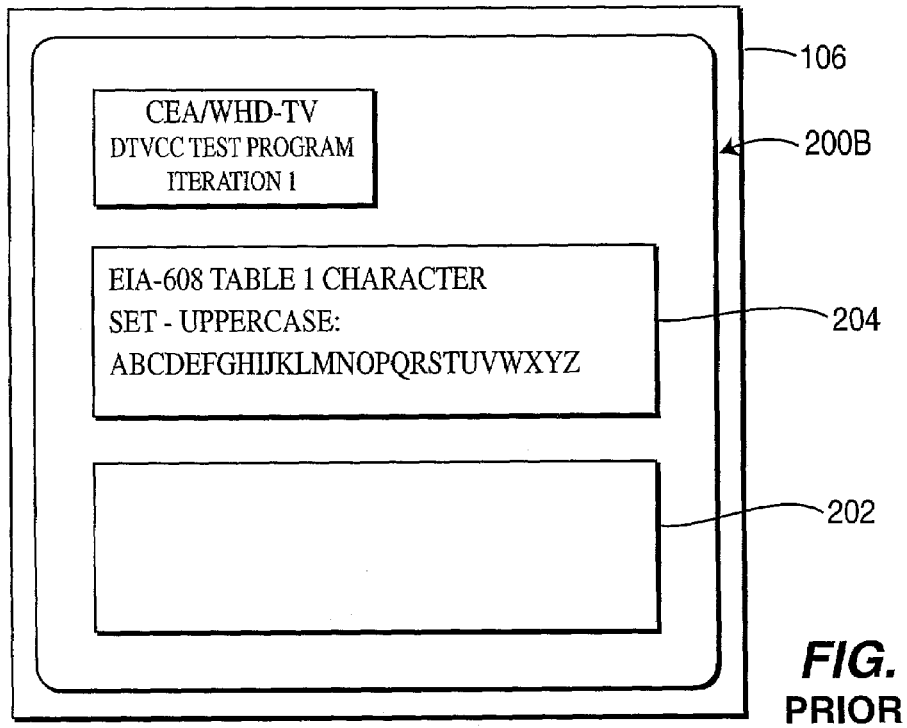
FIG. 2B shows the corresponding test image when closed caption processing is turned off.
Figure 3A:
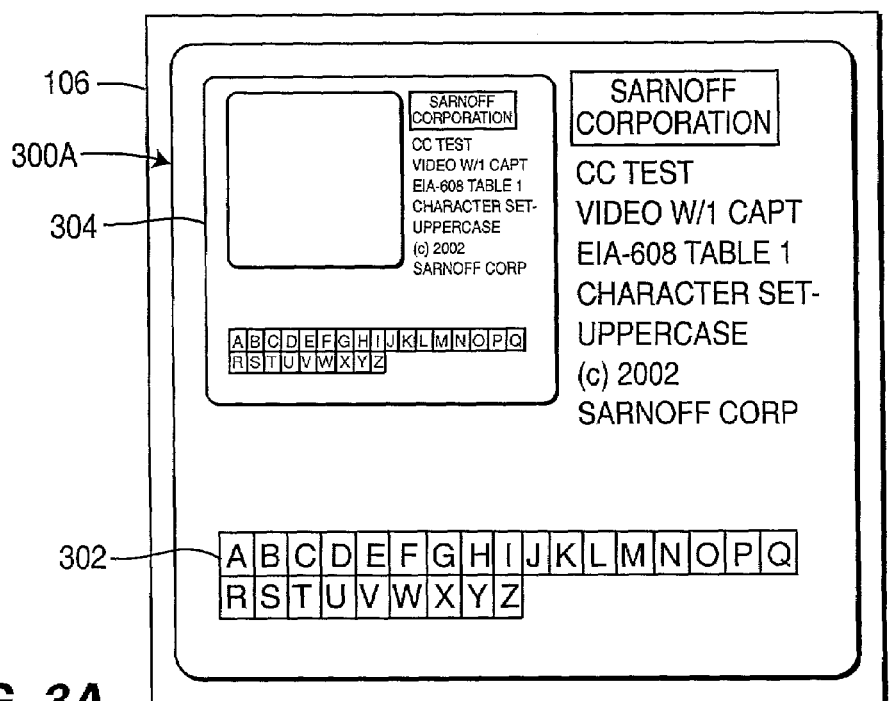
Figure 3B:
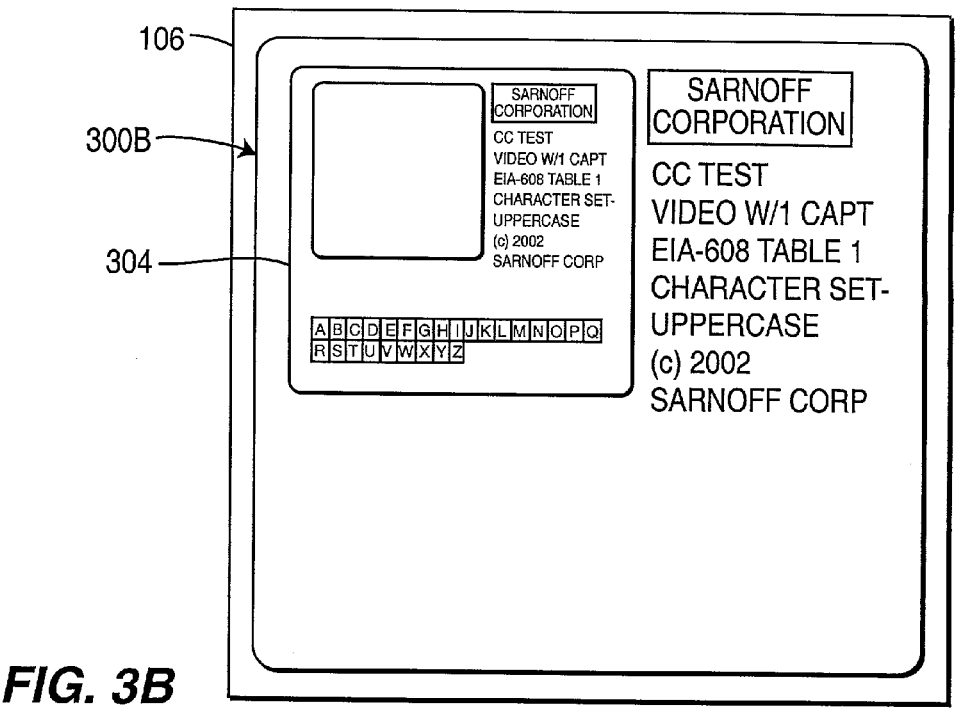
FIG. 3B shows the corresponding test image when closed caption processing is turned off.

FIG. 3A shows an exemplary test image 300A of the present invention. Test image 300A includes CC character blocks 302 and video inset window 304, which represents a reduced (e.g., half-scale) version of test image 300A. The portion of video inset window 304 corresponding to the closed caption window in test image 300A is preferably an identical—albeit reduced—version of CC character blocks 302. FIG. 3B shows corresponding test image 300B when closed caption processing is turned off. Thus, FIG. 3B represents an image generated based on only the video portion of the corresponding test bitstream.

Note that video inset window 304 is not necessarily identical to a reduced version of test image 300A, since such an identical reduced version would have to include an infinite regression of an image with an inset window showing the image with the inset window showing the image, ad infinitum. Although such a version is possible, in the embodiment shown in FIG. 3A, the inset window shown in inset window 304 is purposely left blank. As such, inset window 304 may be said to "represent" test image 300A without necessarily being an exact replica of test image 300A.

Video inset window 304 does however preferably include an exact representation of CC character blocks 302. In particular, the position, color, font, and characters of CC character blocks 302 are represented identically in video inset window 304.

The observer of the rendered test image characterizes the accuracy of the closed caption processing by verifying that the imagery depicted in video inset window 304 accurately represents the entirety of test image 300A. In particular, the observer would be able to easily assess the accuracy of CC processing with regard to the placement of the CC window and the selection of the CC characters, as well as the CC foreground and background colors.

Hidden Video Content

As used in this specification, the term "hidden video content" refers to that portion of the video content that is overlaid by the closed caption content when CC processing is performed properly. According to this feature of the present invention, a test bitstream contains special hidden video content that clearly indicates to the observer when certain aspects of CC processing are not performed properly.

EXAMPLE 1

Figure 3C:
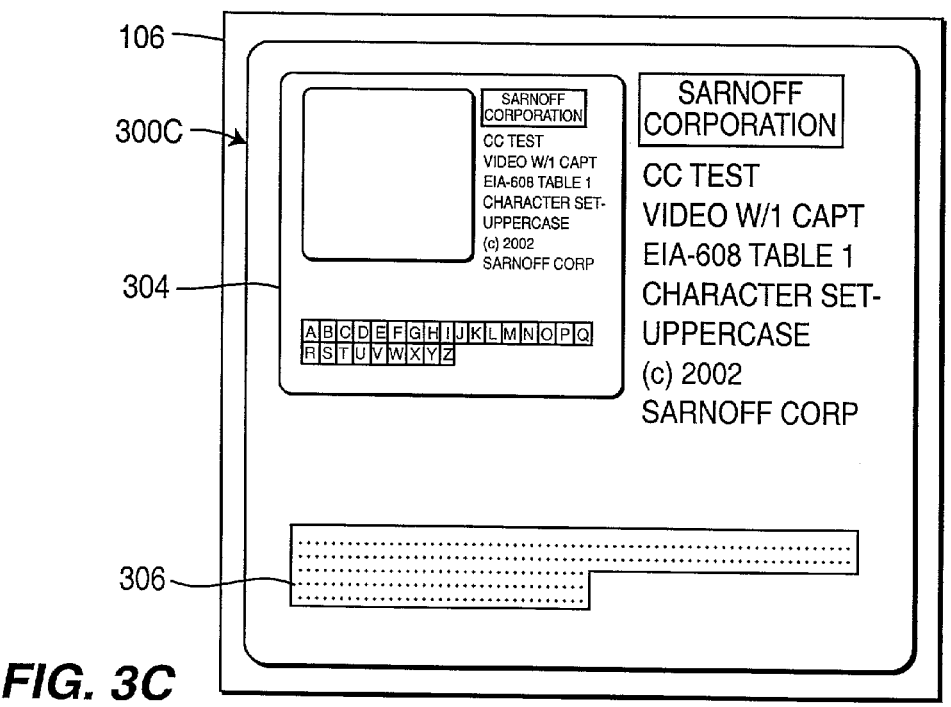
FIG. 3C shows an exemplary test image corresponding to an alternative implementation of the test image of FIG. 3A containing special hidden video content when CC processing is turned off.

FIG. 3C shows an exemplary test image 300C corresponding to an alternative implementation of test image 300A of FIG. 3A when CC processing is turned off. As opposed to test image 300B of FIG. 3B, which contains uniform video content (e.g., a black background) both "under" and "around" the proper location of CC character blocks 302 of FIG. 3A, test image 300C of FIG. 3C contains special hidden video content 306, which corresponds exactly to the location of CC character blocks 302.

If one or more of the CC character blocks are missing or misplaced or processed incorrectly (e.g., transparent or translucent background instead of opaque), then this will be readily apparent to an observer based on the differences between the characteristics (e.g., color, content) of hidden video content 306 as compared to the surrounding video imagery. Although FIG. 3C shows the hidden video content as having a different color from the surrounding video imagery, other types of hidden video content are also possible. For example, the hidden video content could correspond to a "flashing" region with an alphanumeric message, such as "ERRONEOUS CC PROCESSING," which would only be seen if there was erroneous CC processing. Alternative message, such as "Missing Caption," "ToggleWindow Not Implemented," or "See section x.y of EIA-708-B," may be preferable, since they provide more descriptive information about the cause of the error.

Figure 3D:
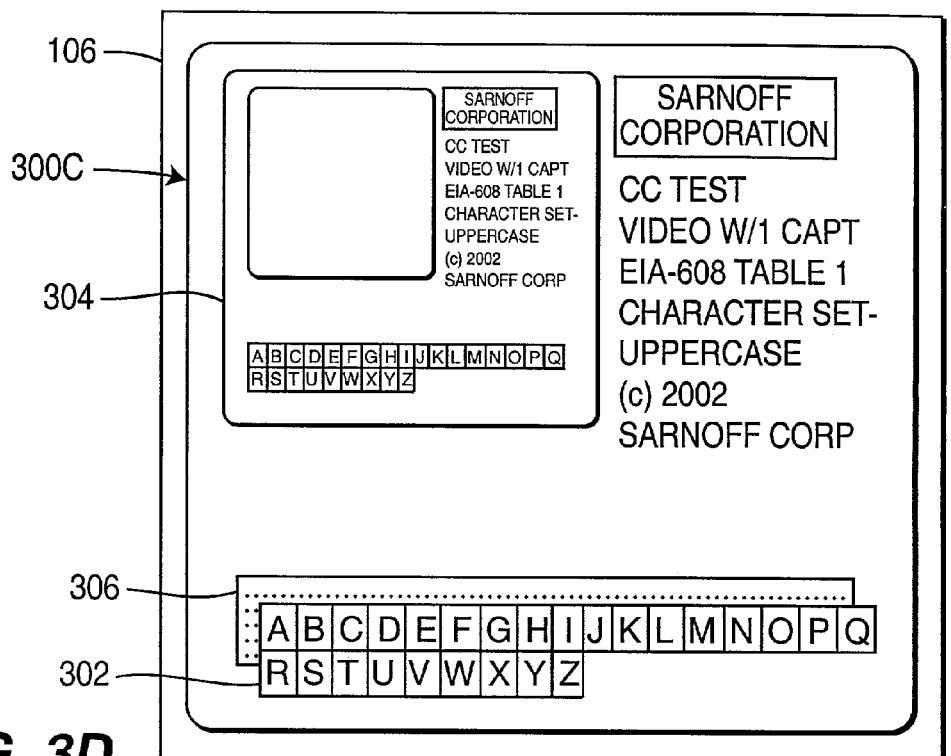
FIG. 3D shows an exemplary test image in which the closed caption processing places the CC character blocks of FIG. 3A at the wrong location in the imagery of FIG. 3C.

FIG. 3D shows an exemplary test image 300D in which the closed caption processing places CC character blocks 302 of FIG. 3A at the wrong location. This error is readily apparent to the observer due to the visibility of a portion of hidden video content 306.

Figure 3E:
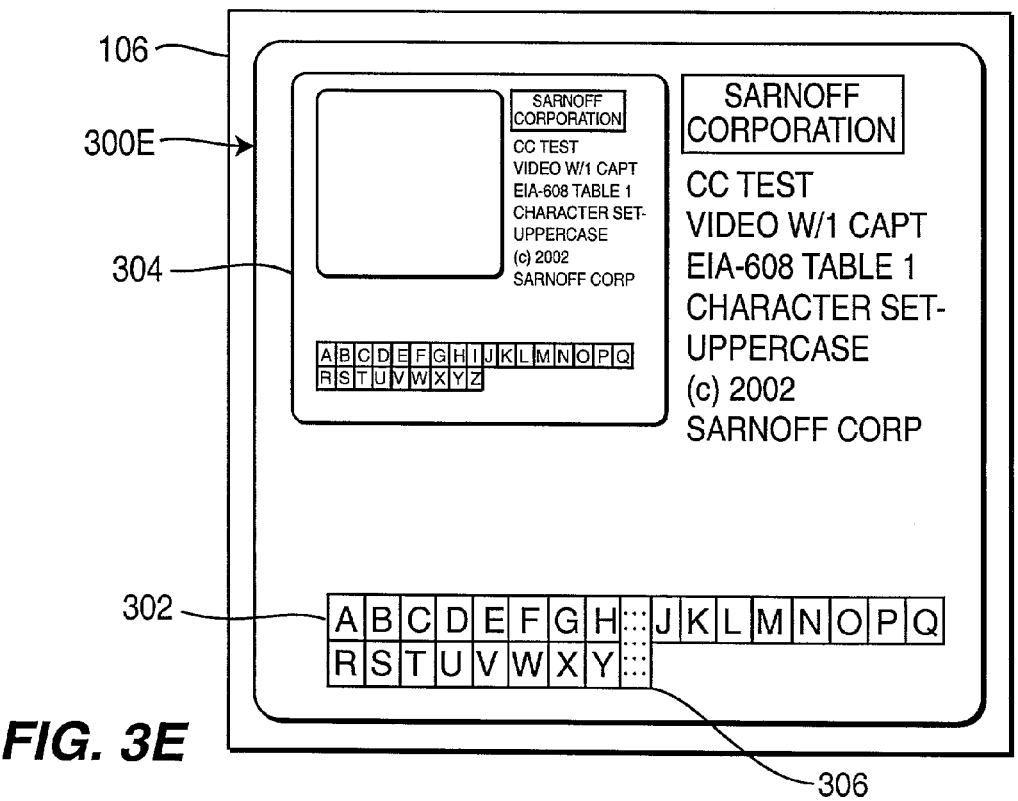
FIG. 3E shows an exemplary test image in which the closed caption processing erroneously omits two of CC character blocks of FIG. 3A in the imagery of FIG. 3C.

FIG. 3E shows an exemplary test image 300E in which the closed caption processing erroneously omits two of CC character blocks 302 of FIG. 3A. In addition to the lack of conformity between the CC character blocks and the corresponding imagery in video inset window 304, these errors are independently apparent to the observer due to the portion of hidden video content 306 that becomes visible when the two CC character blocks are omitted.

Although the examples of FIGS. 3C–3E are shown in the context of test images having video inset windows as described previously in conjunction with FIGS. 3A–3B, the hidden video content feature can be implemented in the context of test images that do not have such video inset windows.

EXAMPLE 2

Figure 4A:
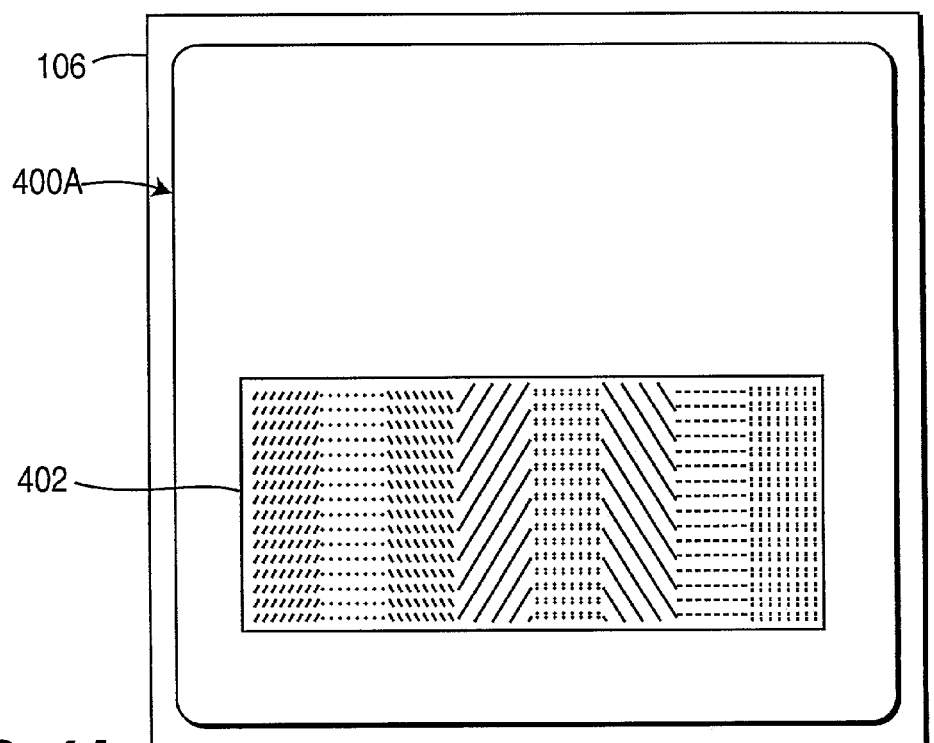
FIGS. 4A–4T show an example of testing eight different CC colors.
Figure 4B:
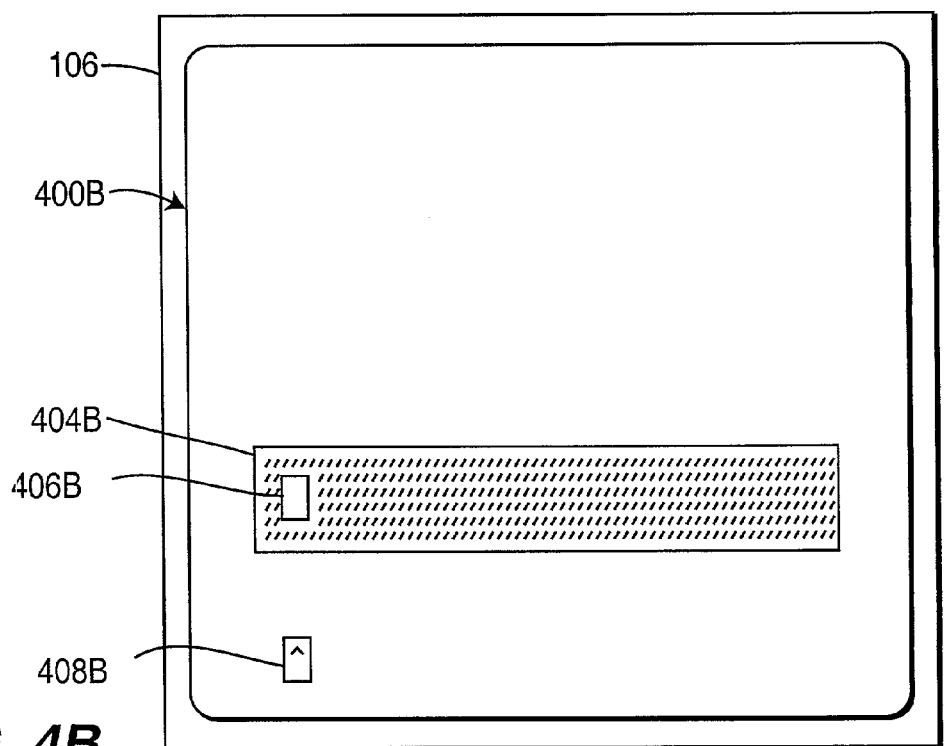
Figure 4C:
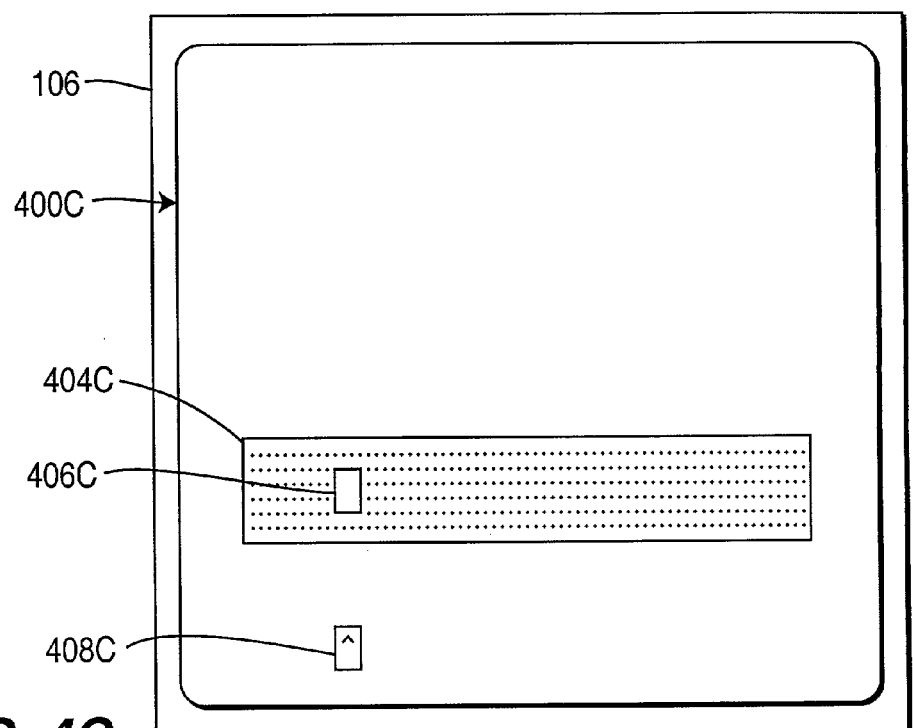
Figure 4D:
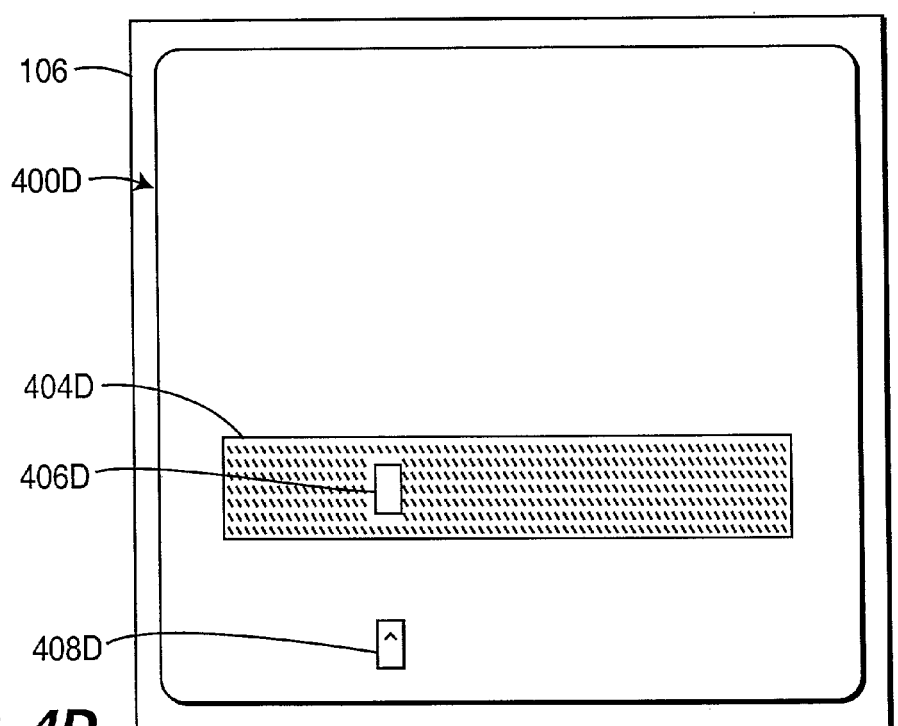
Figure 4E:
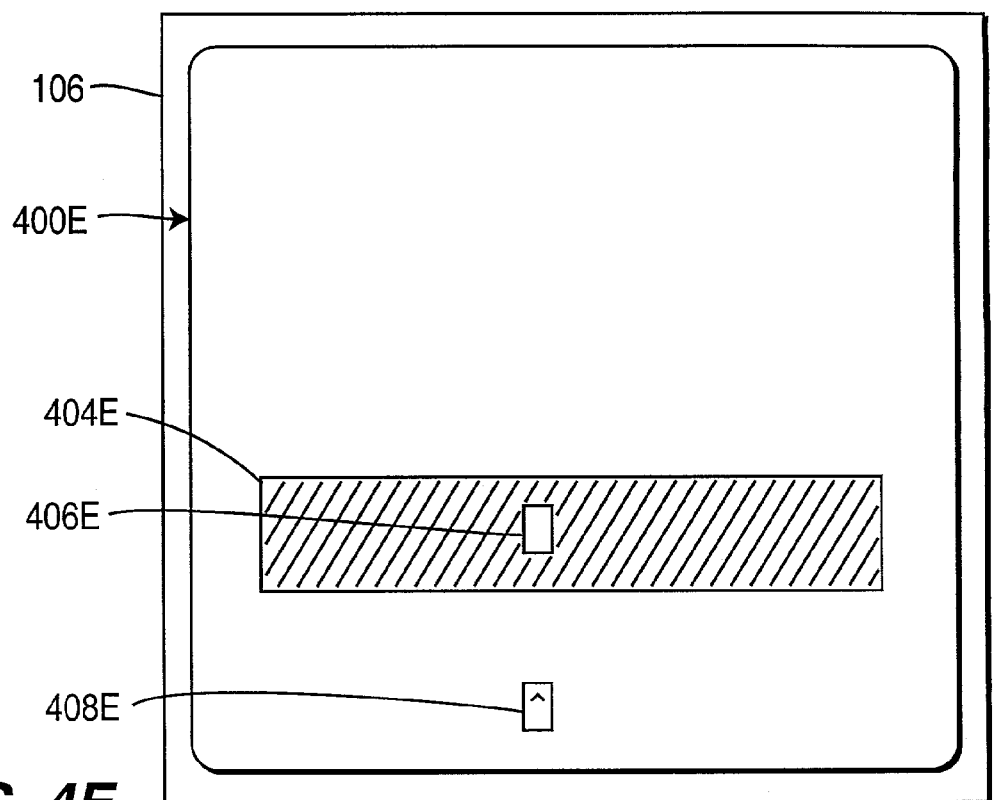
Figure 4F:
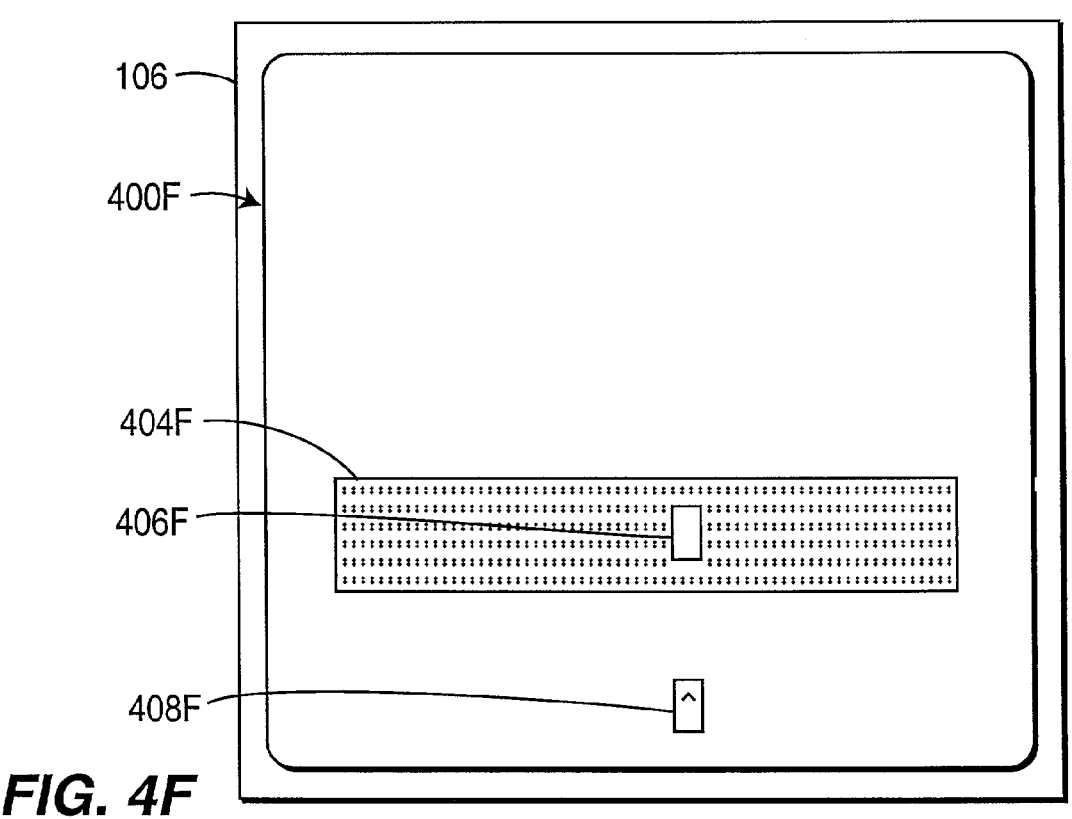
Figure 4G:
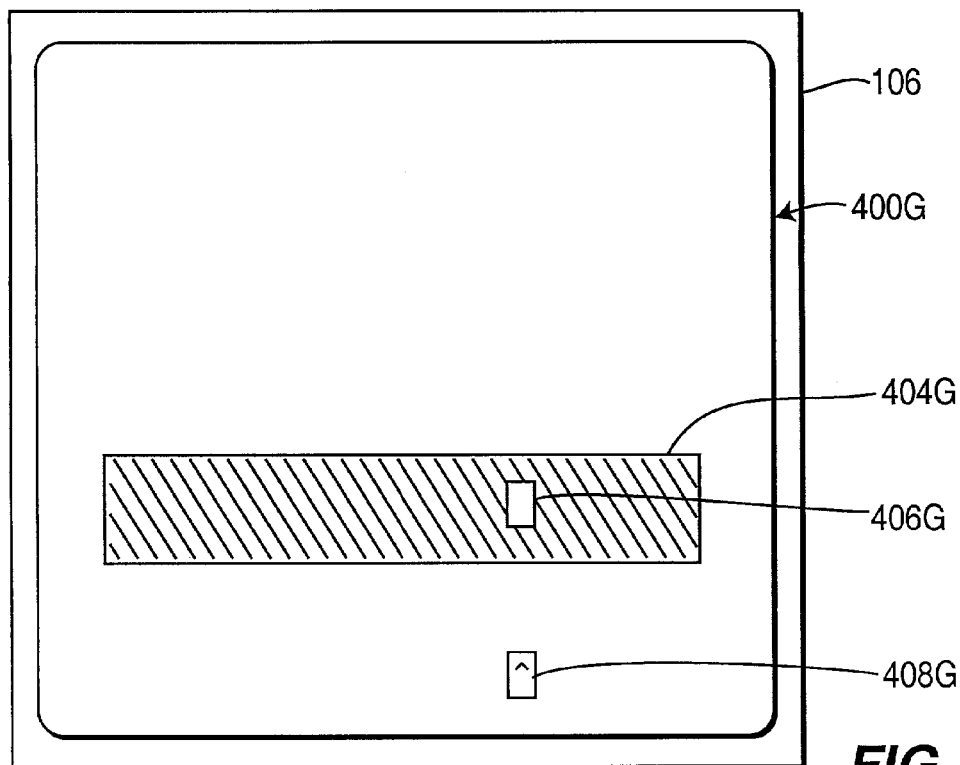
Figure 4H:
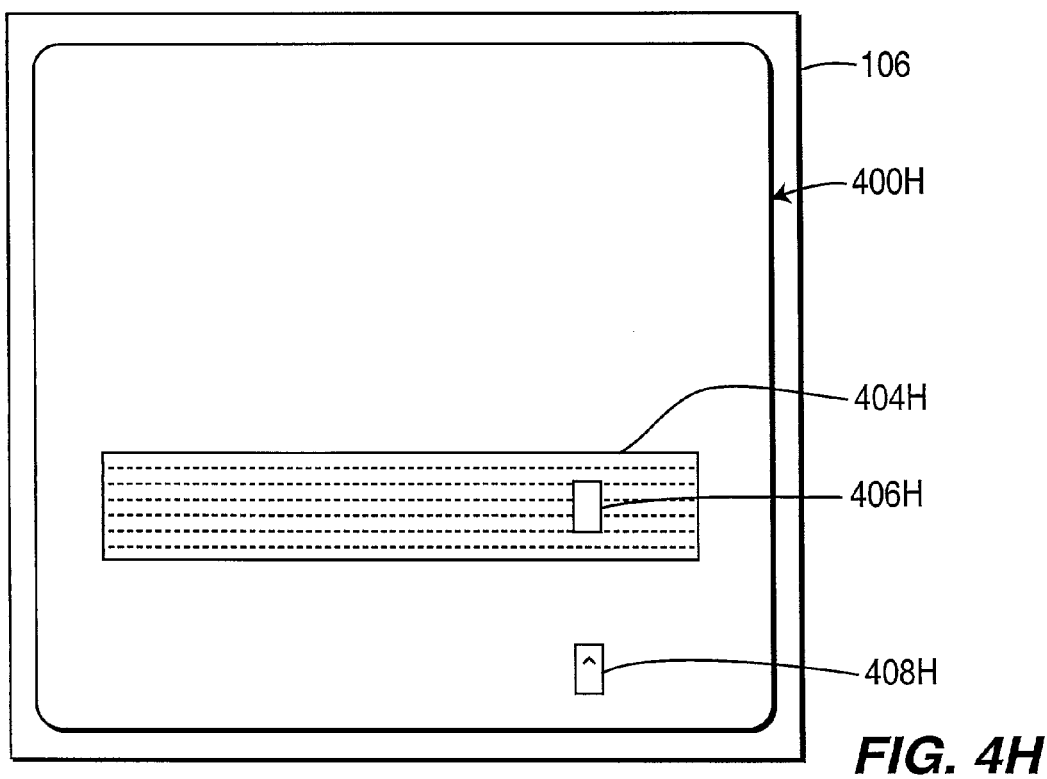
Figure 4I:
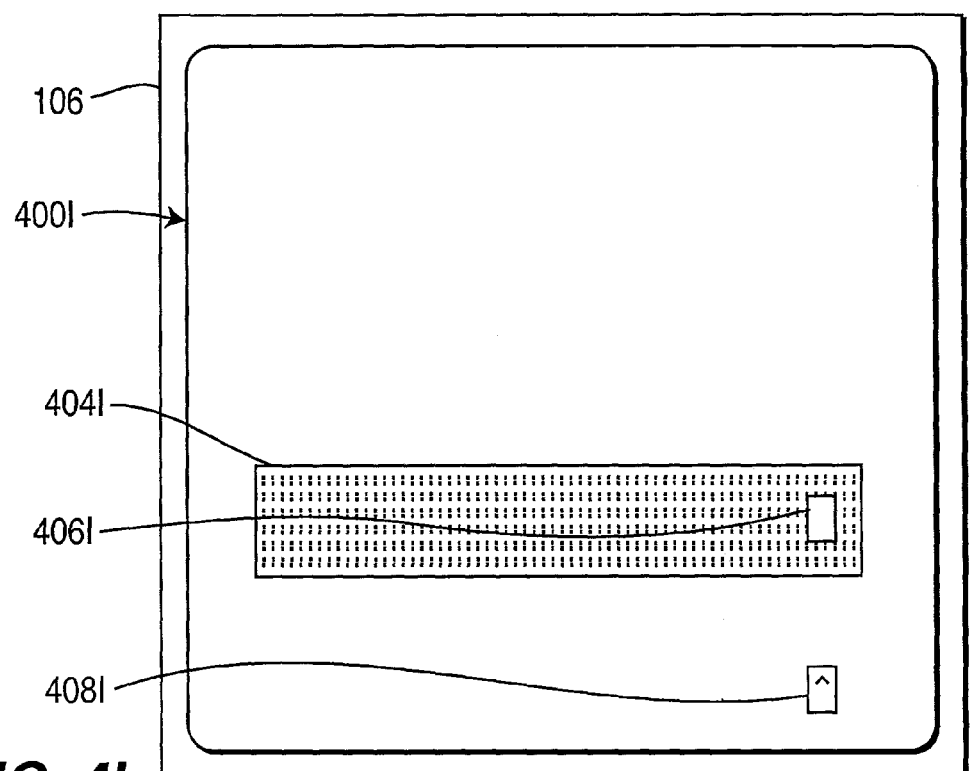
Figure 4J:
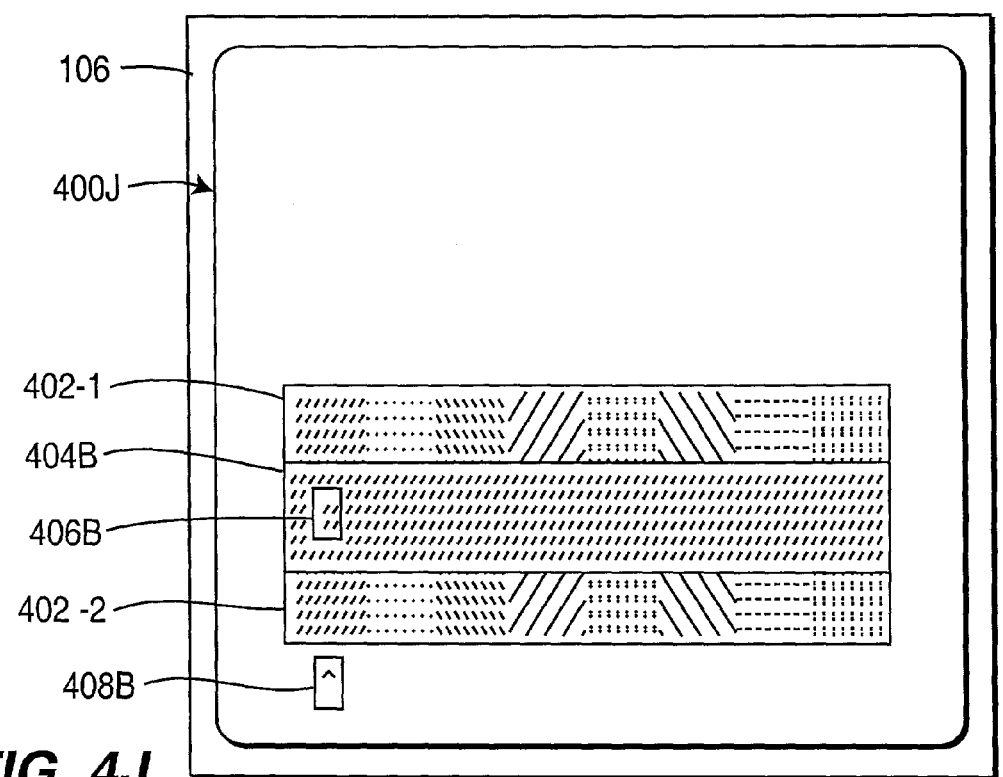
Figure 4K:
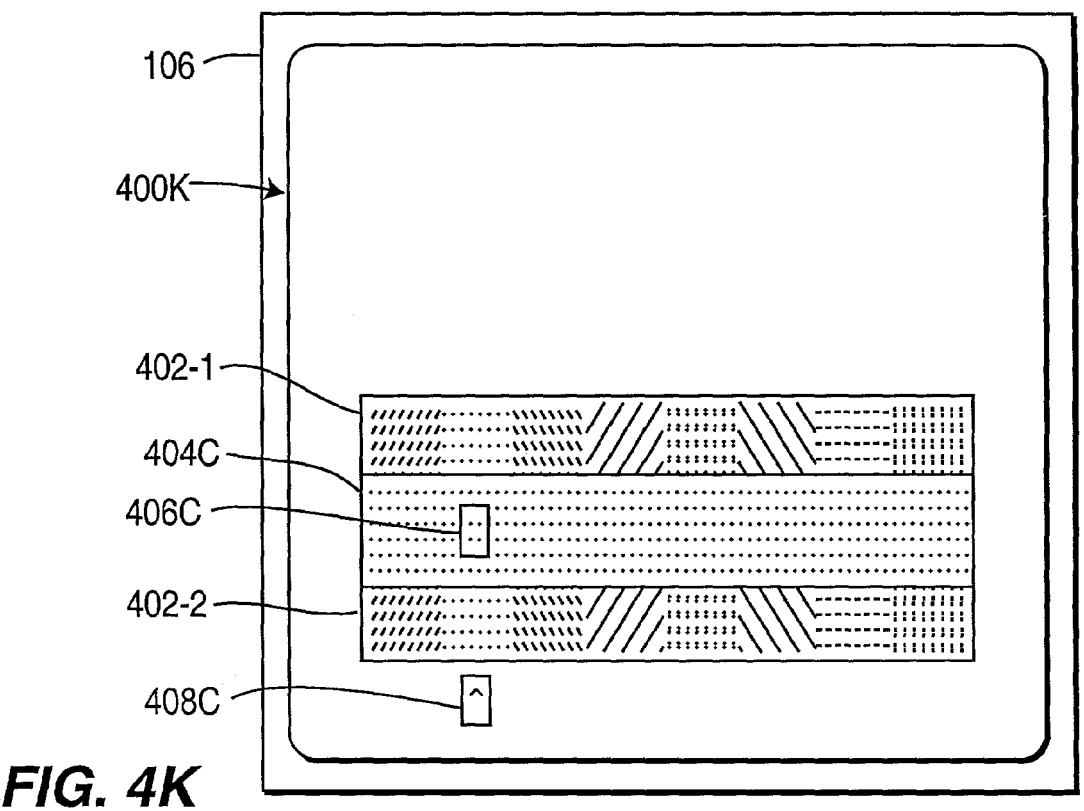
Figure 4L:
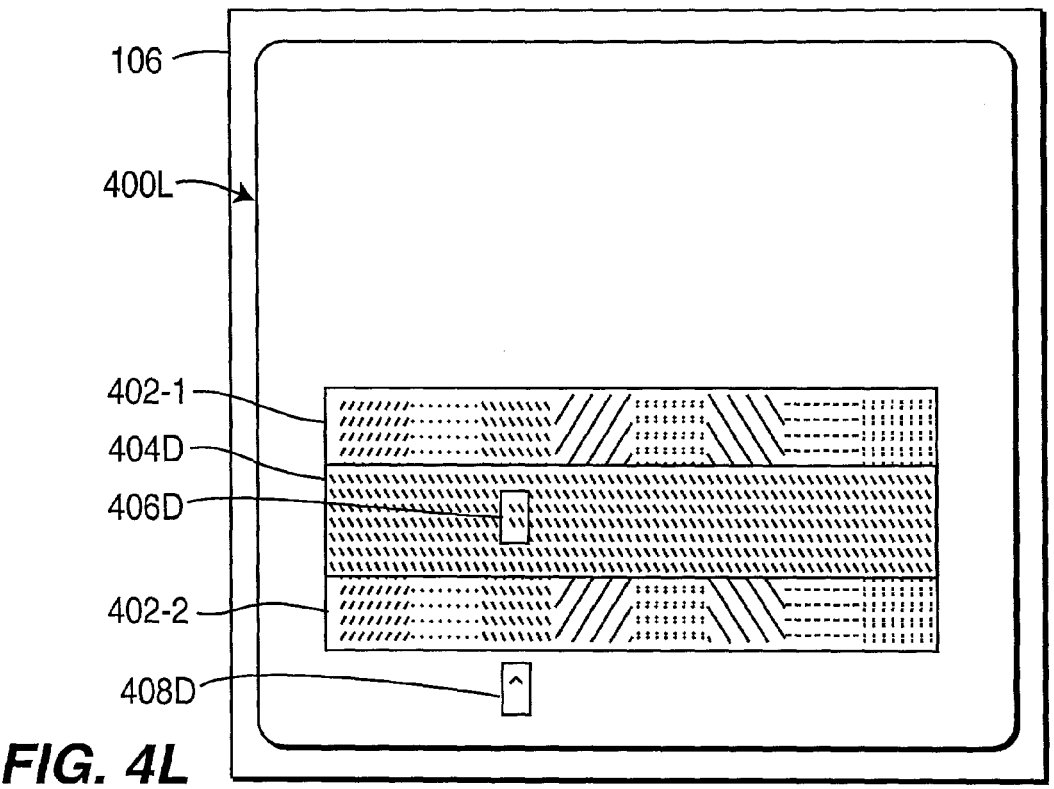
Figure 4M:
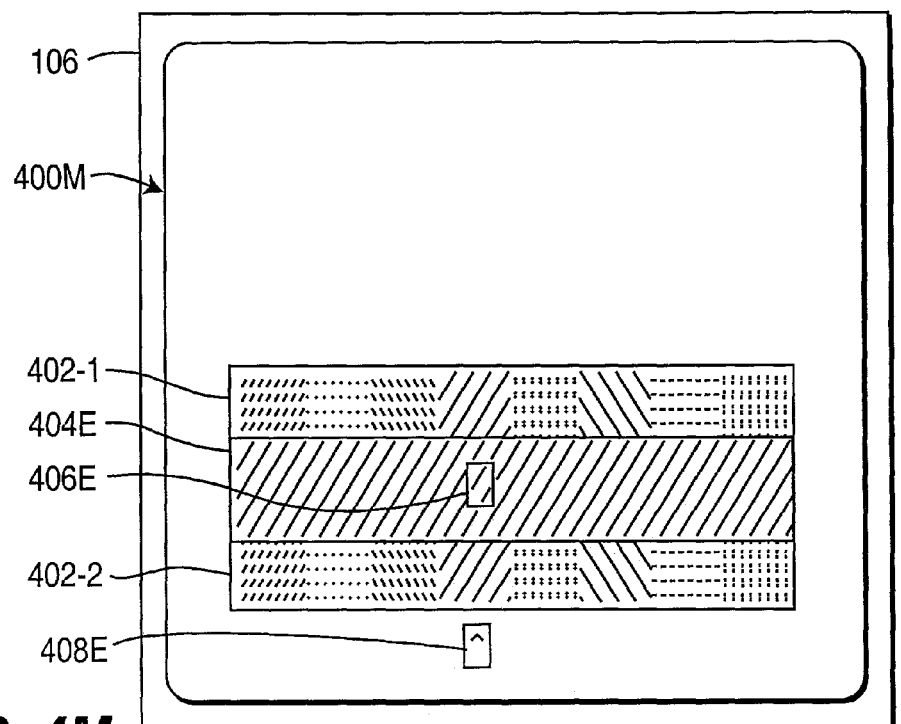
Figure 4N:
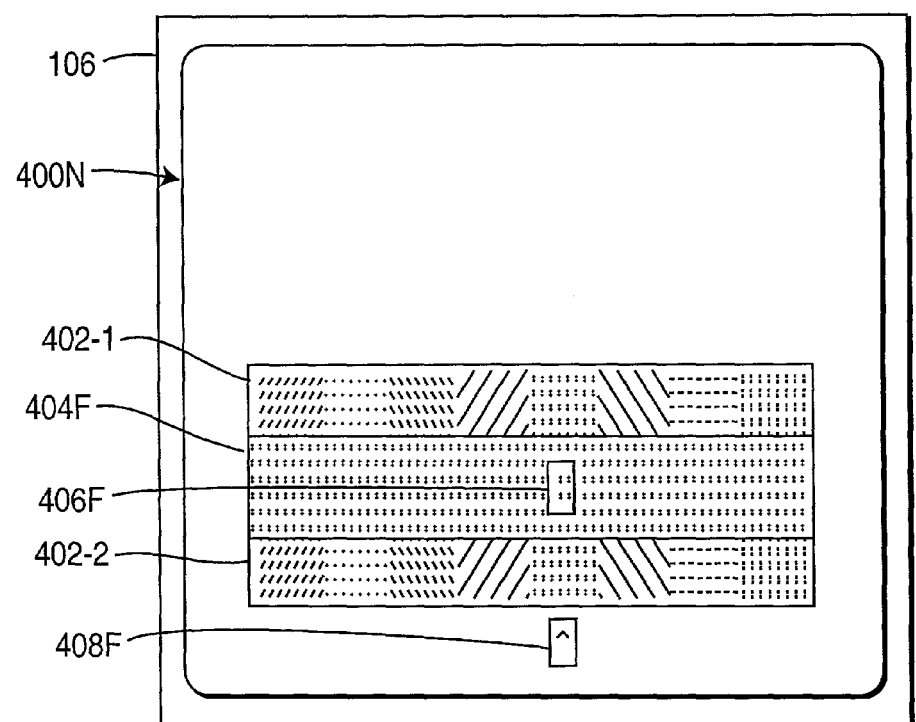
Figure 4O:
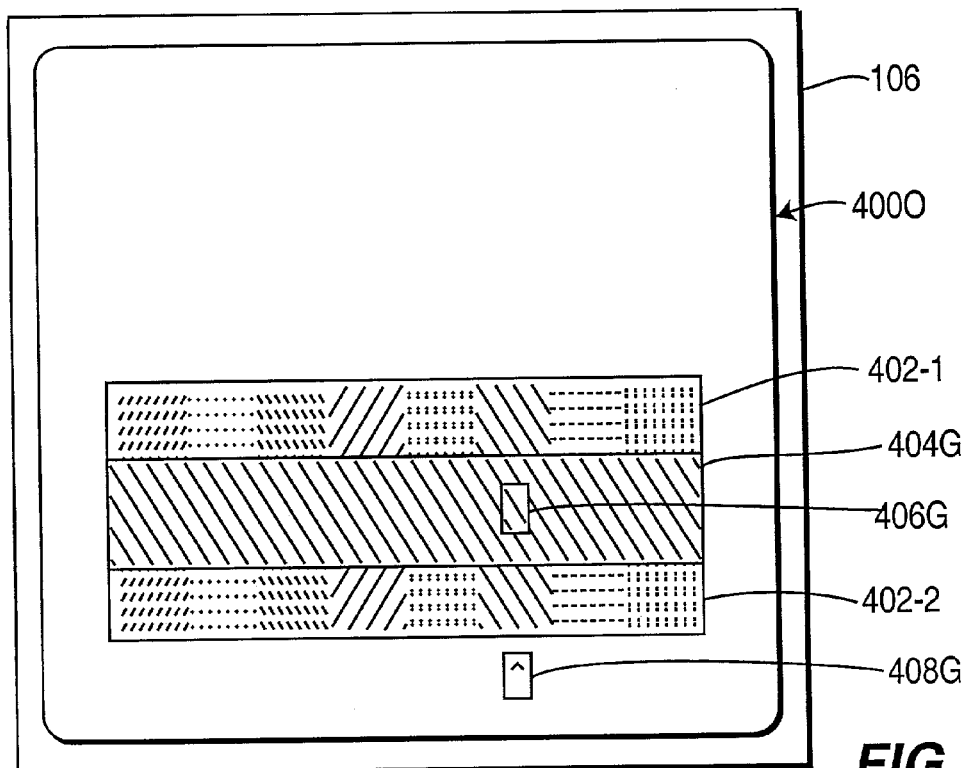
Figure 4P:
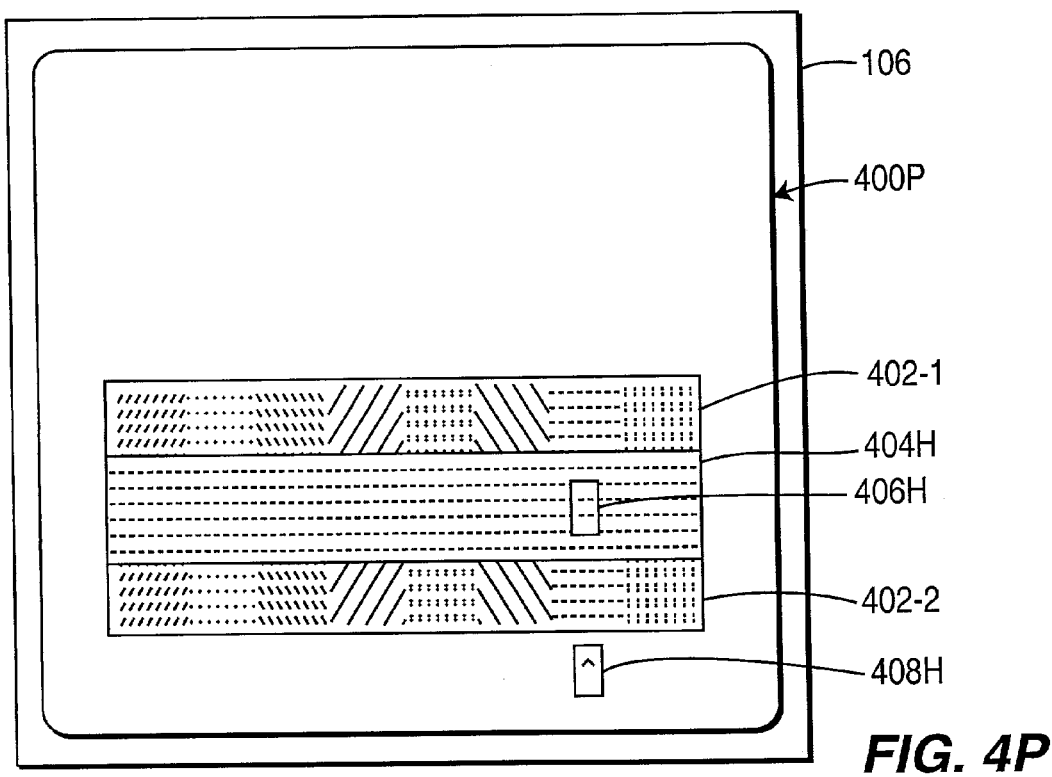
Figure 4Q:
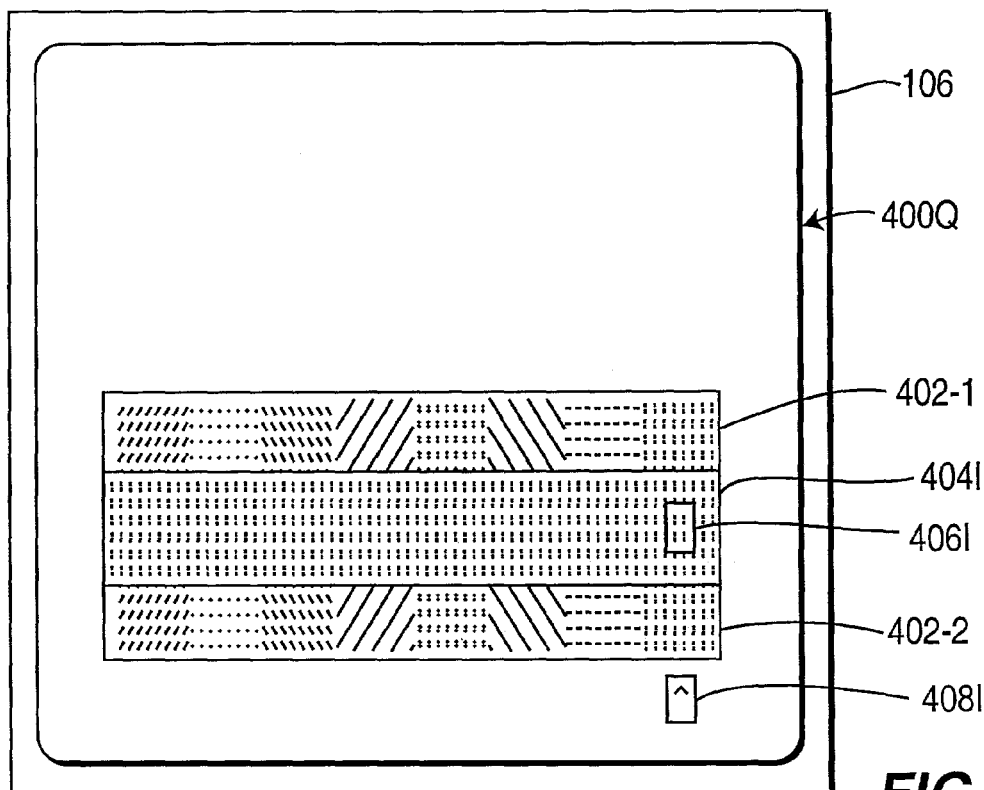
Figure 4R:
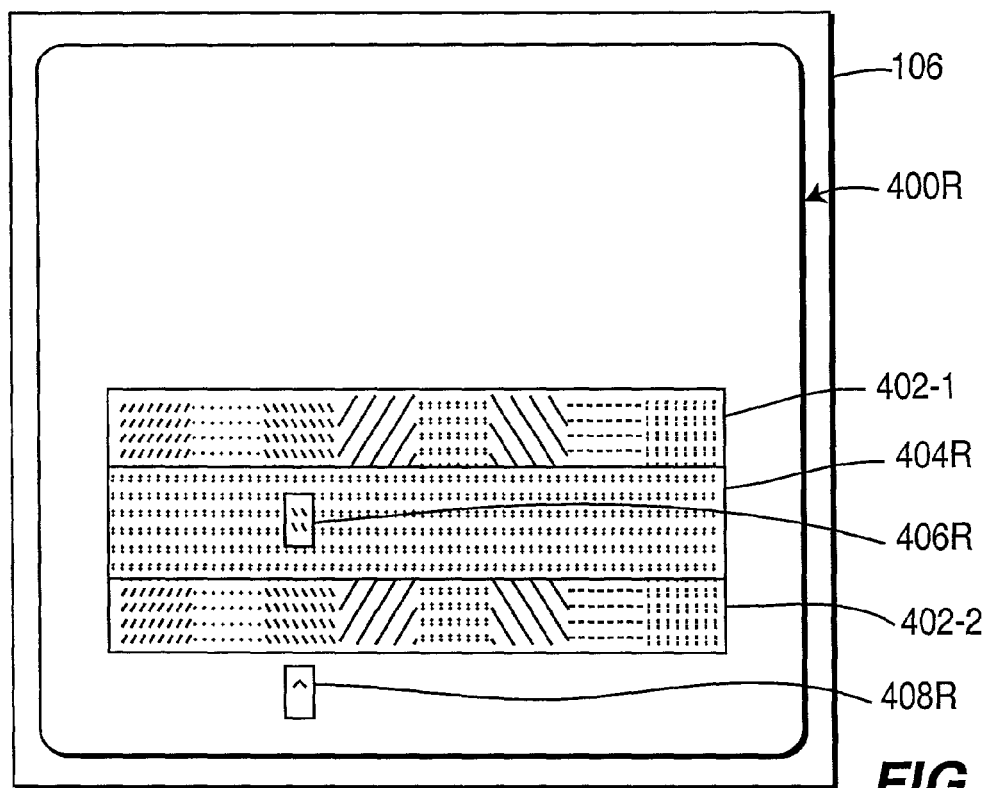
Figure 4S:
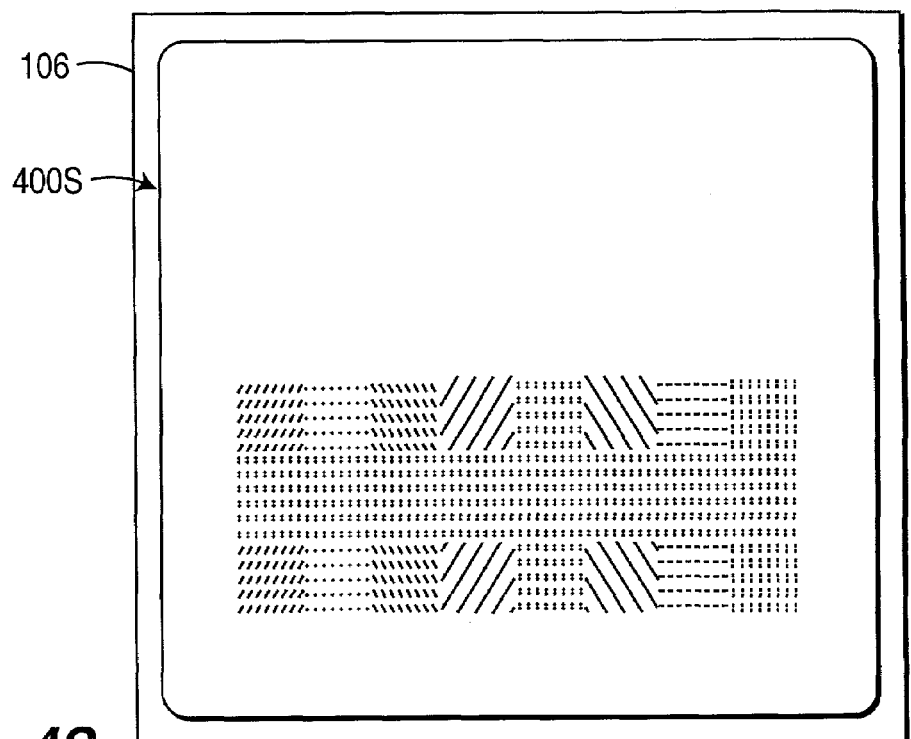
Figure 4T:
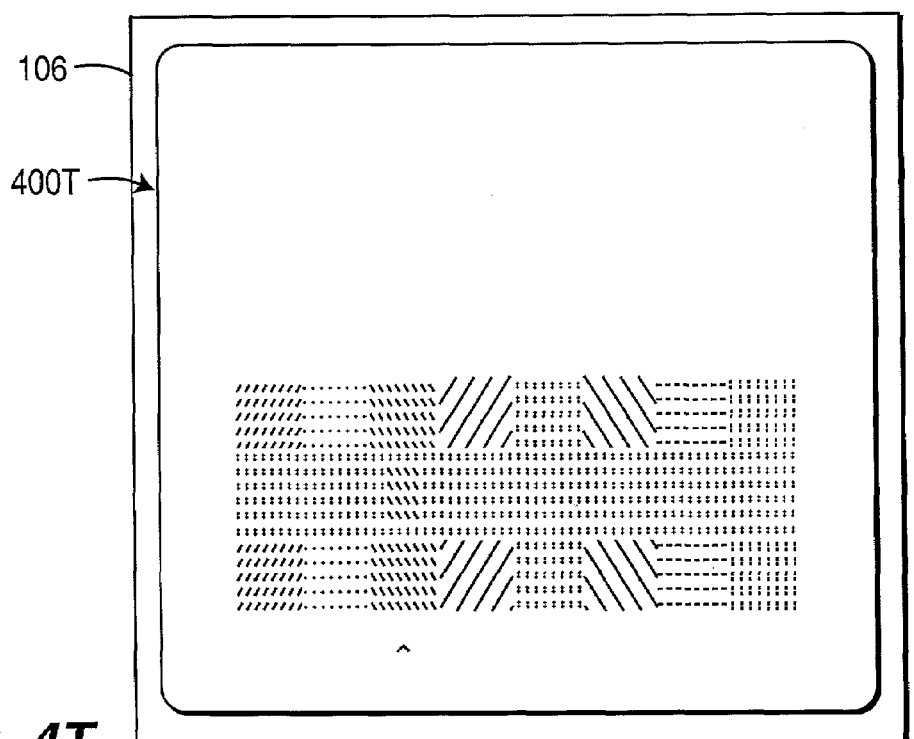

FIGS. 4A–4T show yet another example of hidden video content. FIG. 4A represents the relevant portion of the video content of the single video sequence that is used to verify all eight CC colors. In particular, FIG. 4A shows test image 400A with video portion 402, which has eight different bands of color, each band having a different color.

FIGS. 4B–4I show the closed caption content for the eight different CC colors that are tested using the video content of FIG. 4A. In particular, each of FIGS. 4B–4I has a CC "color" window 404 and a CC "pointer" window 408. Each CC "color" window 404 has a uniform background color corresponding to one of the eight colors in video portion 402 of FIG. 4A. In addition CC "color" window 404 has a transparent region 406 (e.g., generated with one or more transparent CC characters), through which the underlying video content would be visible to the observer. The location of CC "pointer" window 408 and transparent region 406 are selected based on the location of the corresponding color in video portion 402 of FIG. 4A. In alternative implementations, the pointer may be part of the video content of test image 400A of FIG. 4A rather than the CC content of test images 400B–400I of FIGS. 4B–4I, respectively. In other implementations, the pointer may be represented in both the video content and the CC content, where the CC pointer overlays the video pointer when CC processing is performed correctly.

FIGS. 4J–4Q show the test images that are produced when CC processing is performed correctly. In that case, the CC "color" window 404 intersects the corresponding color band in video portion 402 with CC "pointer" window 408 and transparent region 406 providing indicia for verifying the correctness of the CC processing.

FIG. 4R shows an exemplary test image generated by erroneous CC processing. In this example, CC processing was supposed to generate CC "color" window 404 having the color of the third band (from the left) in video portion 402, but erroneously applied the color of the fifth band. Such an error would be readily apparent to an observer given the location of CC "pointer" window 408 as well as the color mismatch between CC "color" window 404 and the corresponding band in video portion 402, which mismatch is additionally highlighted by the underlying video color visible through transparent region 406.

Note that, although different regions in FIGS. 4A–4R are depicted surrounded by boundaries represented by solid lines, in the actual rendered images, such lines might not appear. In that case, the lines in these figures could be interpreted as representing transitions in source (i.e., video or caption), color or other distinguishing characteristic between different regions in the rendered imagery. For example, during correct CC processing, the intersection of the CC "color" window and the corresponding color band in video portion 402 may appear as a single contiguous color region in the rendered test image, including transparent region 406. In that case, FIGS. 4S and 4T may provide a more realistic representation of the actual imagery rendered for the exemplary test images of FIGS. 4N and 4R, respectively.

EXAMPLE 3

In an alternative implementation, CC window colors and borders can be tested with a single caption channel. The video shows a square with a border, where the color of the border changes about once every ¼ second, while the caption stream makes a caption window inside the border with the CC background color following the same color sequence. No text needs to appear in the caption box, although such text is possible. Since there are 4×4×4 or 64 CC colors, such a test would last about 16 seconds. The operator would be able to determine whether the CC processing was correct by comparing the video border color with the CC window background color, rather than requiring the operator to determine whether each of 64 different colors identified sequentially in the video portion by name have been interpreted properly during CC processing.

EXAMPLE 4

The basic concept of FIGS. 4A–4T (i.e., using the underlying video content to indicate appropriateness of overlapping CC content) could also be applied to test different fill opacities. The fill opacity refers to the background color applied to the portion of a CC window extending from just after the right-most character in a line to the right side of the CC window. The SOLID fill opacity applies whatever the caption window background color is. The TRANSPARENT fill opacity allows the underlying video content to show through the CC window. The TRANSLUCENT fill opacity allows the underlying video content to show through the CC window, but in a filtered (e.g., softened) manner. The FLASH fill opacity alternates between SOLID and TRANSPARENT over time.

According to one possible implementation, the underlying video content is designed to highlight the differences between the TRANSPARENT and the TRANSLUCENT fill opacities. When the TRANSPARENT fill opacity is selected, the underlying video content should appear identical to when no CC window is present. When the TRANSLUCENT fill opacity is selected, however, the underlying video content is specifically selected to appear different as a result of the softening effect of the TRANSLUCENT window. For example, the underlying video content could correspond to a sequence of narrow white and black vertical or horizontal stripes that would appear as a uniform gray color when seen through a TRANSLUCENT window.

Multiple Caption Services

One of the drawbacks to prior art CC test bitstreams is that each different test of a caption service involves a different video sequence. As a result, thorough closed caption testing using prior art techniques typically requires a significant amount of video data. DTV television signals support up to 63 simultaneous caption data streams for each video stream. According to this feature of the present invention, two or more different closed caption services are tested using the same sequence of video images, thereby reducing the bandwidth requirements for such CC testing as compared to the prior art.

EXAMPLE 1

Figure 5A:
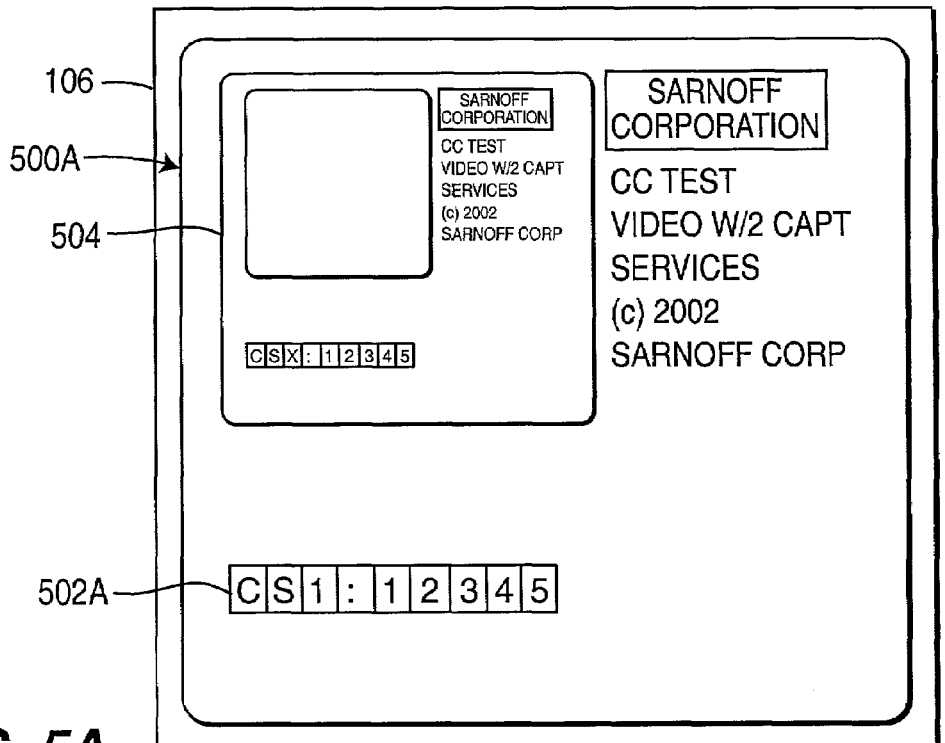
FIGS. 5A–5C show exemplary test images in which the same sequence of video images is used to test two different CC services.
Figure 5B:
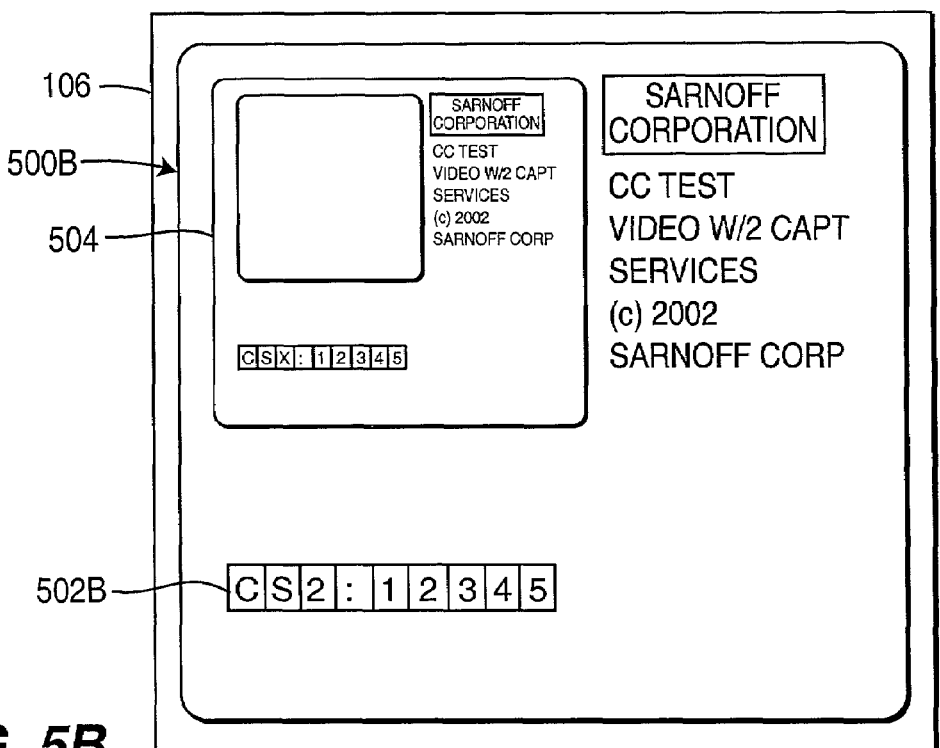
Figure 5C:
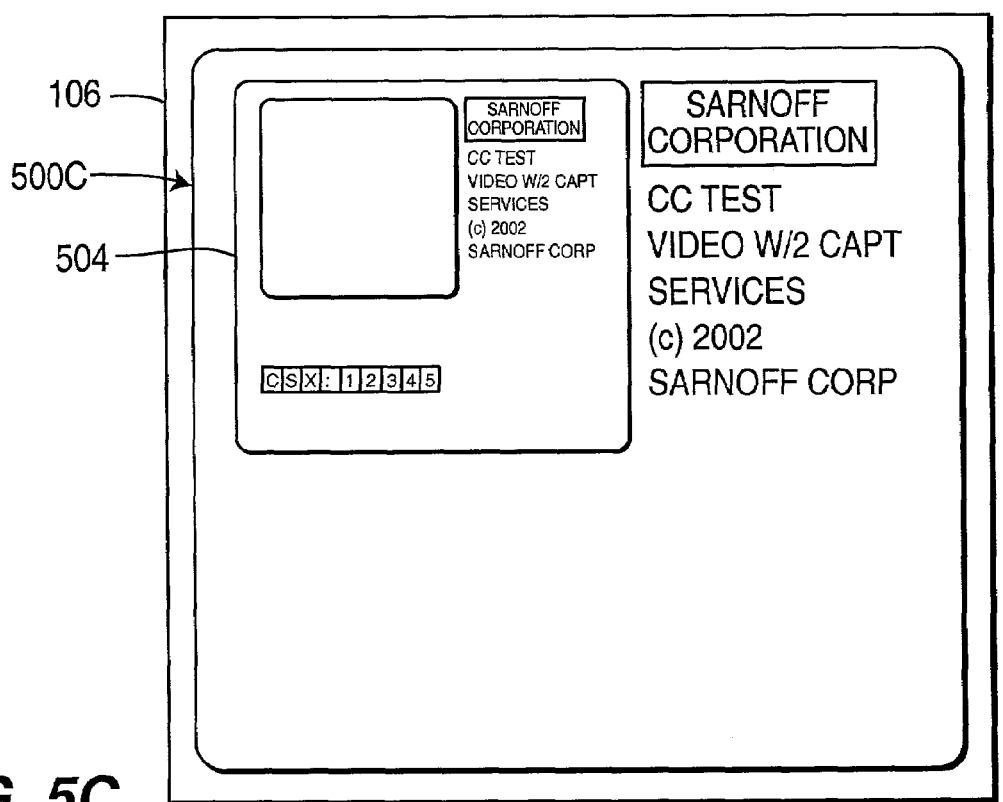

FIGS. 5A–5C show exemplary test images in which the same sequence of video images is used to test two different CC services. In particular, FIG. 5A shows test image 500A corresponding to a test of the closed caption service in which CC characters 502A (e.g., "CS1:12345") are rendered in the caption window from left to right, while FIG. 5B shows test image 500B corresponding to a test of the closed caption service in which CC characters 502B (e.g., "54321:2SC") are rendered in the caption window from right to left. In the first case, the closed caption will contain the message "CS1:12345" while, in the second case, the closed caption will contain the message "CS2:12345". Both of these messages are represented in video inset window 504 by video imagery corresponding to "CSx:12345" which provides a general description of the different closed caption streams. As such, the same video content (e.g., image 500C shown in FIG. 5C) can be used to test both of these caption services, thereby reducing the overall size of the test bitstreams as compared to those for equivalent prior art CC testing.

In order to identify to the observer which of the different caption services are being tested, CC characters 502A are purposely selected to be slightly different from CC characters 502B (i.e., "CS1" instead of "CS2"). As such, video inset window 504 contains a general representation (i.e., "CSx") of both CC characters 502A and 502B. The observer verifies the accuracy of the CC processing by comparing the rest of the CC characters in the rendered CC window with their representation in the video inset window.

EXAMPLE 2

Another example of testing multiple caption services using a single video stream involves video imagery corresponding to a CC window that appears to float across the screen over time. Such an effect can be achieved using any one of (at least) the following four different CC services:

(1) Redefining windows in different locations in successive video frames;

(2) Defining a number of windows in different locations and then selectively using DisplayWindows( ) in successive video frames to make different windows appear in different frames;

(3) Defining a number of windows in different locations and then selectively using ToggleWindows( ) in successive video frames to make different windows appear in different frames; and (4) Defining a number of windows at a single time and then selectively using several Delay( )[DLY( )] and DisplayWindow( ) commands with different values to make the windows appear to move at different locations in successive frames.

In this example, a single video sequence could be used to test all four CC services, where the video inset window would have imagery representing the floating CC window with text, such as "Test n" in it. For the four different CC services, the actual floating CC window could have appropriate corresponding text, such as "Test 1", "Test 2", "Test 3", and "Test 4", respectively. The operator would select between the caption services to run the four tests.

EXAMPLE 3

In yet another example, the displayed video content indicates timing for the testing of multiple caption services. In particular, the video content could include a count-down timer and/or a "progress bar" (as in Microsoft Windows file transfers) indicating how complete the currently tested effect should be at the current time, where the different caption services are all designed to take the same amount of time to complete. In one possible implementation, the following six different CC channels could be defined to test CC window fades, wipes, and delays:

(1) a fade;

(2) a left-to-right wipe;

(3) a right-to-left wipe;

(4) a top-to-bottom wipe;

(5) a bottom-to-top wipe; and (6) a delay, where the command Delay(t) DisplayWindow (n) causes window n to be displayed after time t.

In this example, each caption service would begin at the same time and end at the same time relative to the single set of video content, which is repeatedly displayed for each CC test.

Closed Caption Timing

According to this feature of the present invention, the test bitstreams are designed to test the timing of the closed caption processing. In certain implementations of this feature, the video content has a number of time-varying regions that vary in similar ways, but offset in time from one another to provide a temporal reference against with the caption content is characterized. Further, there is some similarity or relationship between the time-varying video regions and the rendering of the CC content. The CC content may take the form of text, rendered onto the video output as a time-varying overlay that, depending on the implementation, may or may not overlap the time-varying video regions in the resulting rendered imagery. The observer can readily characterize the timing of the CC processing by observing the timing and/or position of the CC content relative to the video content. In particular, the observer will be able to detect which region of video content is most nearly time-coincident with the (overlaid) CC content. The nature of the regions are specifically designed to help the observer to determine the relative delay between the transmission of the CC content and its rendering on the display device.

EXAMPLE 1

Figure 6:
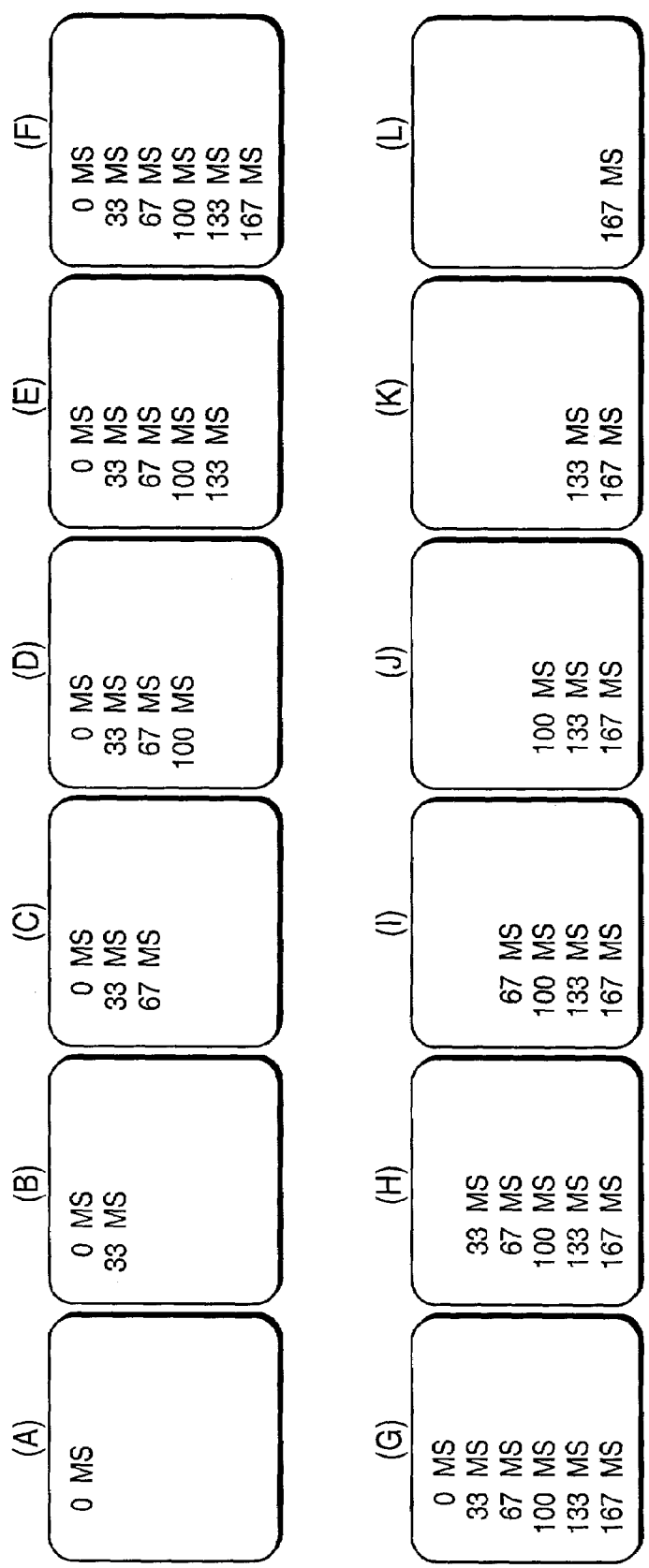
FIGS. 6A–6L show a sequence of images corresponding to the video content of a test bitstream, according to one embodiment of the present invention.
Figure 7:
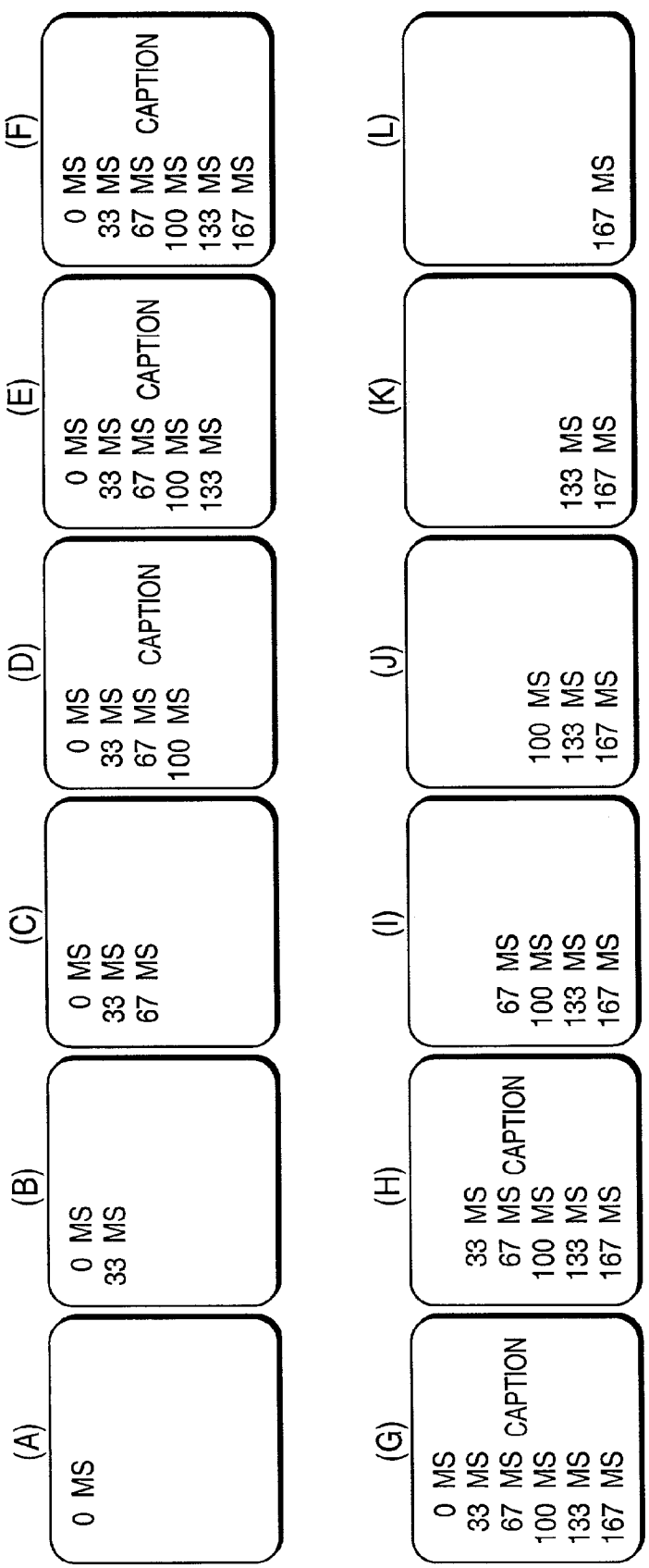
FIGS. 7A–7L show exemplary test images that are generated based on CC processing in the context of the imagery of FIGS. 6A–6L.

FIGS. 6A–6L show a sequence of images corresponding to the video content of a test bitstream, according to one embodiment of the present invention. In particular, the imagery of FIG. 6B is preferably initially rendered about 33⅓ ms after the initial rendering of the imagery of FIG. 6A. Similarly, the imagery of FIG. 6C is preferably initially rendered about 33⅓ ms after the initial rendering of the imagery of FIG. 6B, and so on, until the imagery of FIG. 6F is rendered. In an analogous manner, the imagery of FIG. 6H is preferably initially rendered about 33⅓ ms after the initial rendering of the imagery of FIG. 6G, and so on, until the imagery of FIG. 6L is rendered. Thus, the sequence of FIGS. 6A–6L corresponds to a first 167-ms time period, followed by a second 167-ms time period. Note that the duration between FIGS. 6F and 6G is preferably short (e.g., about ½ second), but is not critical, and may even be zero (i.e., where FIGS. 6F and 6G represent not just the same imagery but the same image).

According to one embodiment of the present invention, the video content in sequence of images in FIGS. 6A–6L can be used to characterize the relative delay between the transmission of CC data and the rendering of the corresponding CC content. In one implementation, FIG. 6A represents the image corresponding to the transmission time of a CC "Display Window" command that instructs the decoder to begin to render a particular CC window, while FIG. 6G represents the image corresponding to the transmission of a CC "Hide Window" command that instructs the decoder to stop rendering that same CC window. The delay between CC command and the rendering of the corresponding CC content can then be characterized by the observer viewing the sequence of images with rendered CC content.

FIGS. 7A–7L show exemplary test images that are generated based on such CC processing. In particular, FIGS. 7A–7F indicate that there was a delay of between 67 and 100 ms between the transmission of the "Display Window" command and the initial rendering of a CC window containing the text "CAPTION". Similarly, there was a delay of between 67 and 100 ms between the transmission of the "Hide Window" command and the final rendering of that window, as indicated by FIGS. 7G–7L. The process is then repeated over and over. As a result, the word "CAPTION" will appear to be synchronized with one of the numerical values, which will indicate the system's decoding delay. Although FIGS. 7A–7L show an example in which the delays following the "Display Window" command and the "Hide Window" command are both the same and constant, it is possible that the interpretation timing of different commands could be different and/or that the interpretation timing of commands varies over time. Such occurrences may be detected by the observer of this test.

EXAMPLE 2

Another technique for visually determining synchronization of caption decoding uses opaque caption boxes to hide a pattern in the video. An observer can easily see the timing of the caption box display, and therefore the latency between video and caption decoding. Measurements can be made to the frame, and, in some circumstances, to the field. This technique can be implemented using two different types of tests: pop-up tests and pop-down tests. In a pop-up test, the caption box hides part of the video pattern before it appears, and the observer measures delay by observing the last part of the video pattern visible before the caption box "pops up."

In a pop-down test, the caption box is initially displayed, thereby obscuring part of the video pattern, but is removed at the synchronization point. Synchronization is measured by observing what part of the video pattern is visible after the caption box is removed.

FIGS. 8A–8M show the video pattern that can be used for pop-up and pop-down tests of caption synchronization. Each of FIGS. 8A–8M has an identical lower timescale indicating the full time scale from −4 to +8, where the periods (".") represent intervening odd integers. Depending on the implementation, the number may represent video frames or other unit of time. In addition, each of FIGS. 8A–8M has an upper timescale that identifies the relative timing of the current frame. For example, FIG. 8A represents the frame at time −4, FIG. 8B represents the frame at time −3, and so on, until FIG. 8M representing the frame at time +8.

To implement a pop-up test of caption synchronization, a caption command to display a caption box (e.g., all black) over the upper timescale in the video pattern of FIGS. 8A–8M is included in the test bitstream. When caption processing is performed correctly, the caption box should be initially rendered in the frame corresponding to time 0 (i.e., FIG. 8E). In particular, for nominal synchronization, the number "0" will be visible in the pop-up test, while the dot following the "0" will not appear.

If caption processing is not perfectly synchronized, then the caption box will appear either before or after FIG. 8E. FIGS. 9A–9M illustrate an example of a pop-up test in which caption processing lags video processing by about two time units. In particular, the caption window initially appears in FIG. 9H instead of FIG. 9E.

To implement a pop-down test of caption synchronization using the video pattern of FIGS. 8A–8M, a caption box may be initially displayed over the upper timescale in the video pattern and a caption command to hide the caption box is included in the test bitstream. When caption processing is performed correctly, the caption box should be initially hidden in the frame corresponding to time 0 (i.e., FIG. 8E), thereby enabling the underlying video content to be seen. In particular, for nominal synchronization, the number "0" will be visible in the pop-down test, while the dot before the "0" will not appear.

If caption processing is not perfectly synchronized, then the caption box will disappear (and the underlying video content appear) either before or after FIG. 8E. FIGS. 10A–10M illustrate an example of a pop-down test in which caption processing lags video processing by about two time units. In particular, the caption window disappears in FIG. 10H instead of FIG. 10E.

Figure 8:
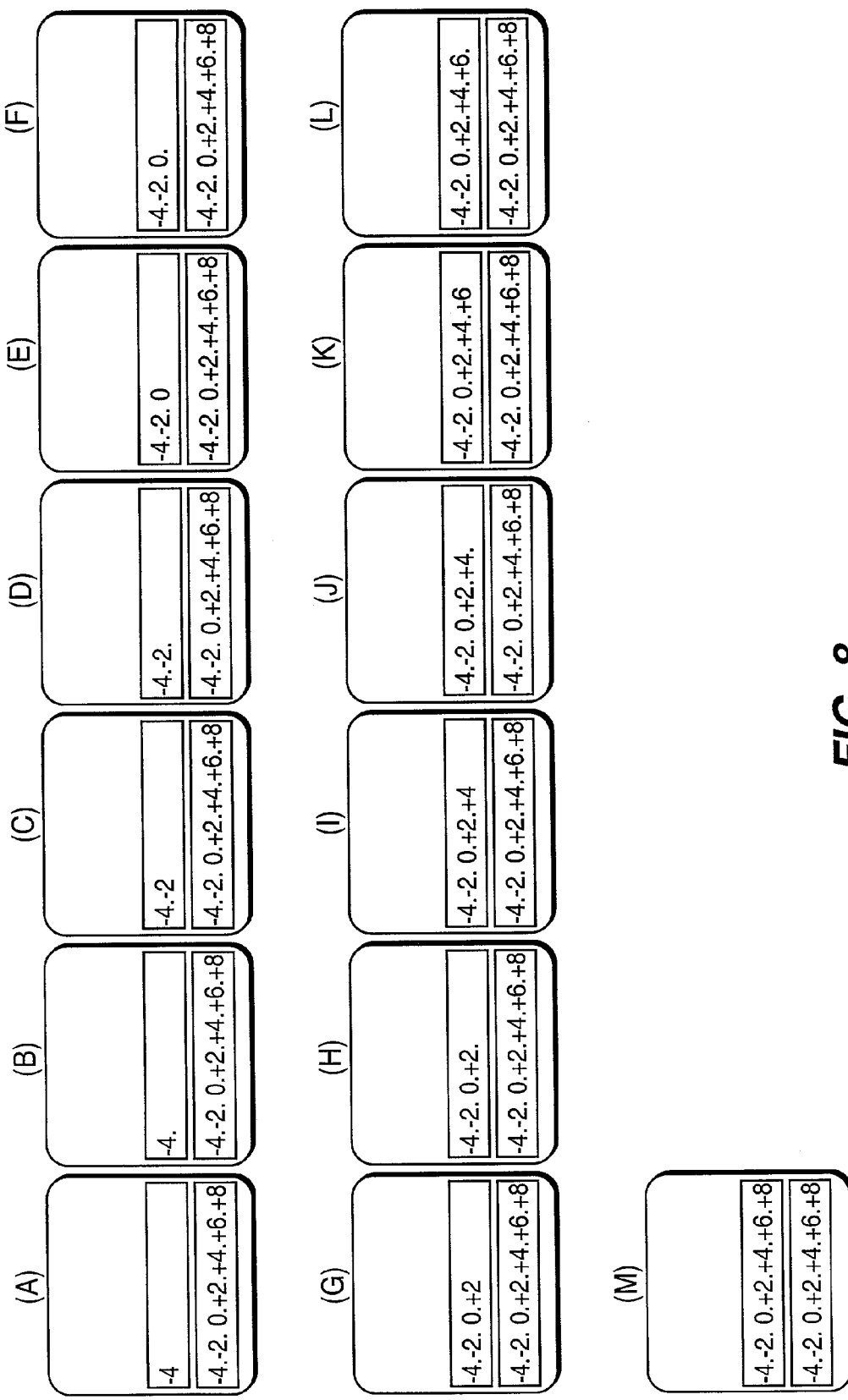
FIGS. 8A–8M show the video pattern that can be used for pop-up and pop-down tests of caption synchronization.
Figure 9:
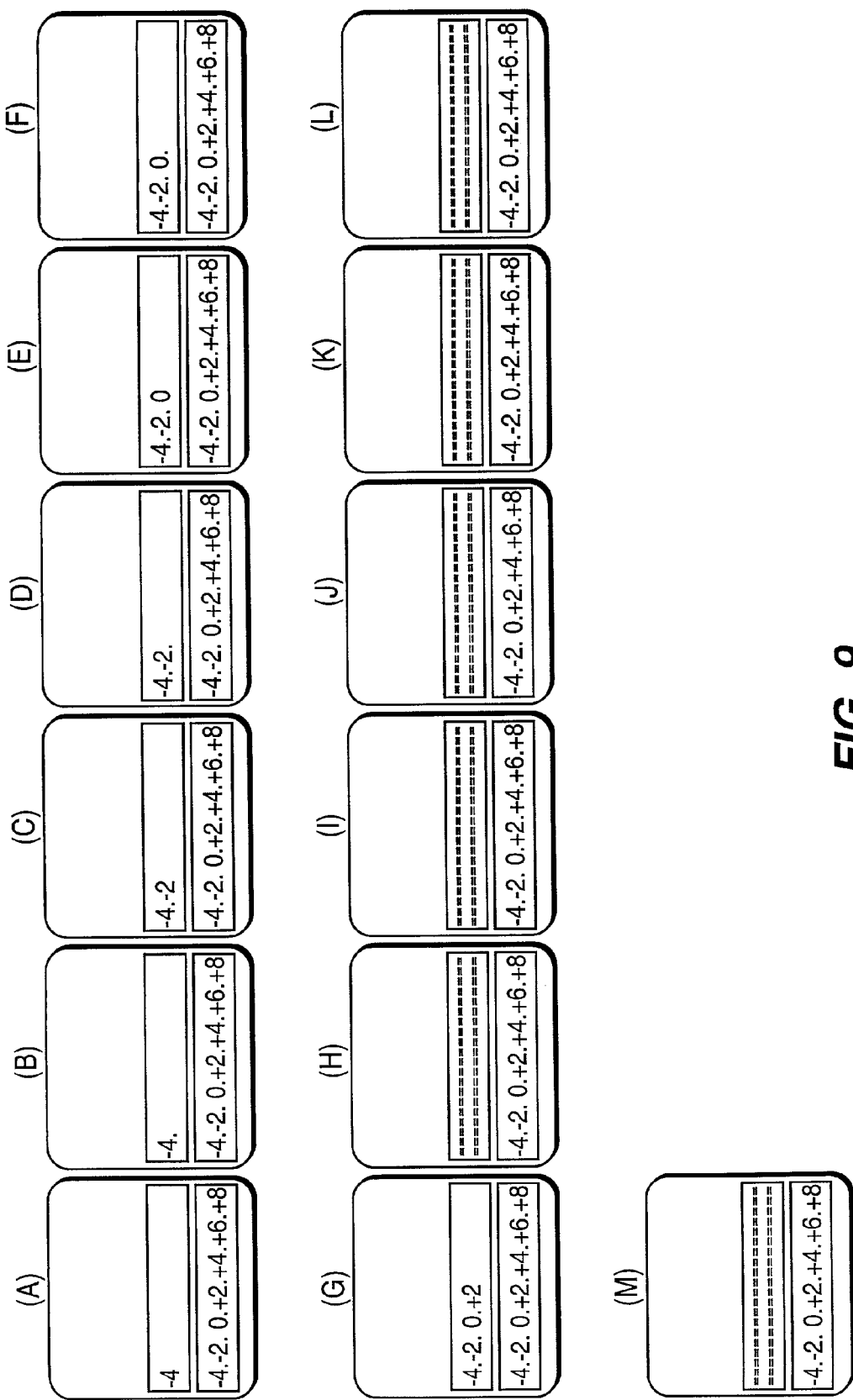
FIGS. 9A–9M illustrate an example of a pop-up test in which caption processing lags video processing by about two time units.
Figure 10:
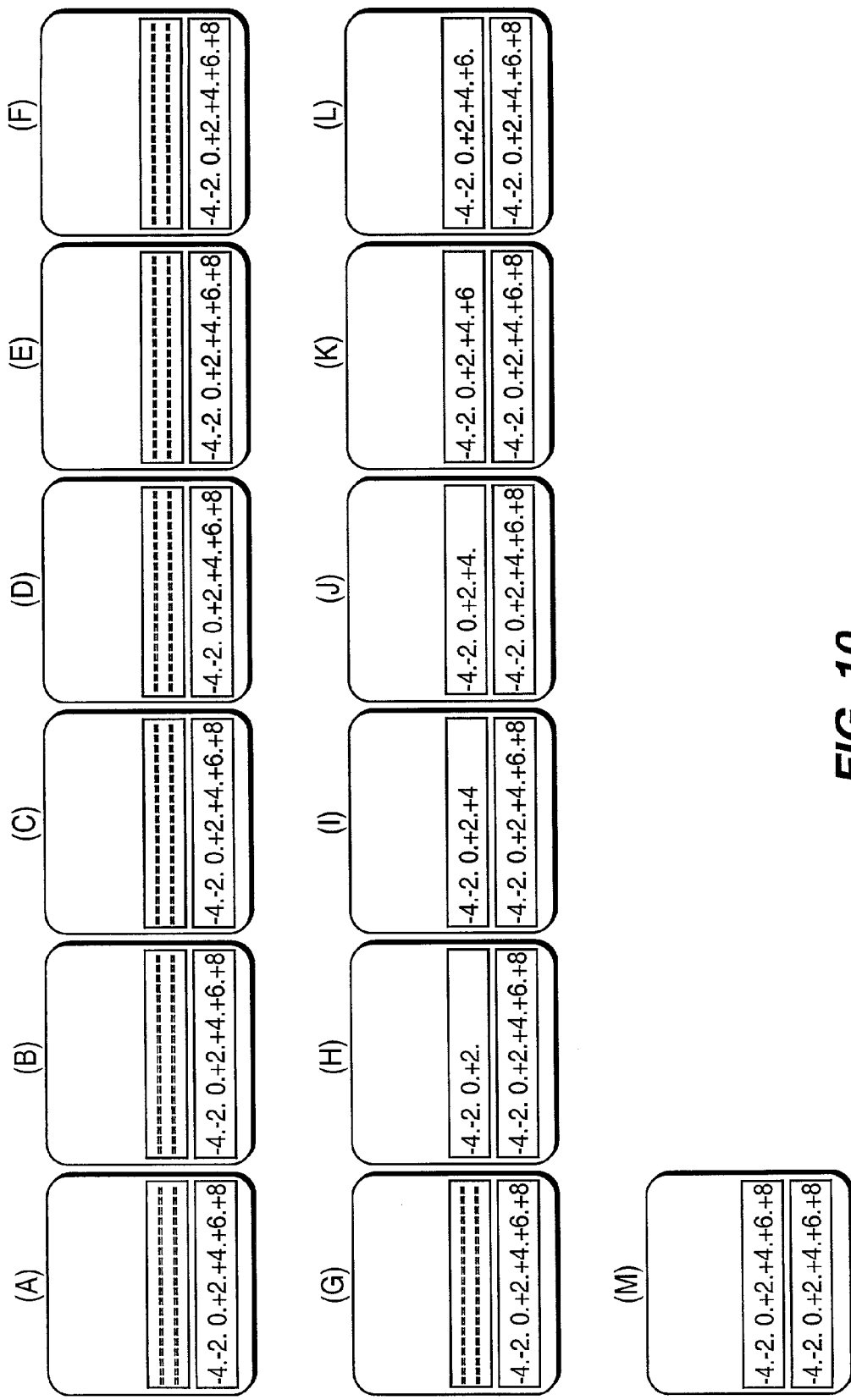
FIGS. 10A–10M illustrate an example of a pop-down test in which caption processing lags video processing by about two time units.
Figure 11:
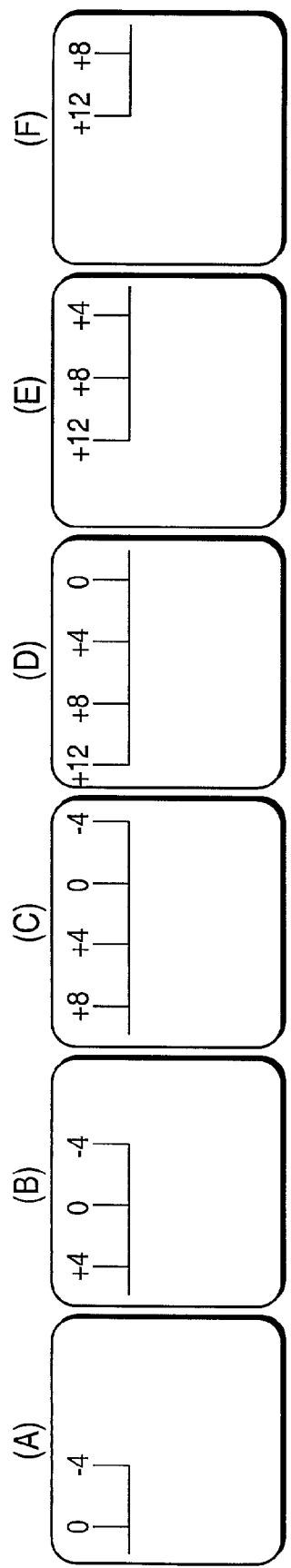
FIGS. 11A–11F show a video pattern in which a timescale scrolls from left to right across the display.
Figure 12:
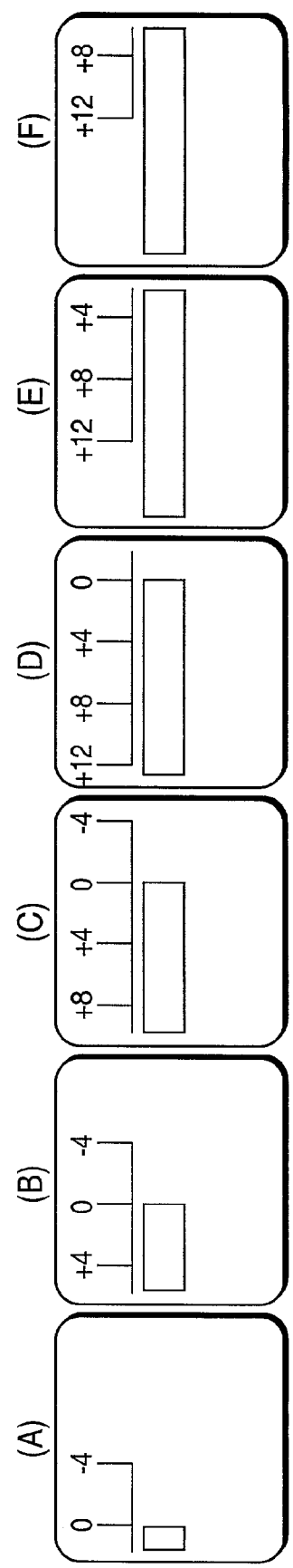
FIGS. 12A–12F show the resulting sequence when caption processing is properly synchronized with the video of FIGS. 11A–11F.
Figure 13:
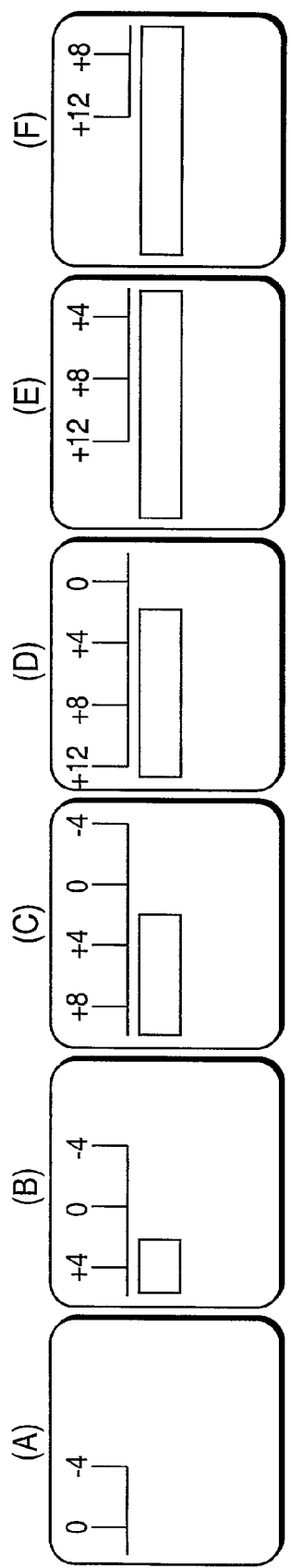
Figure 14:
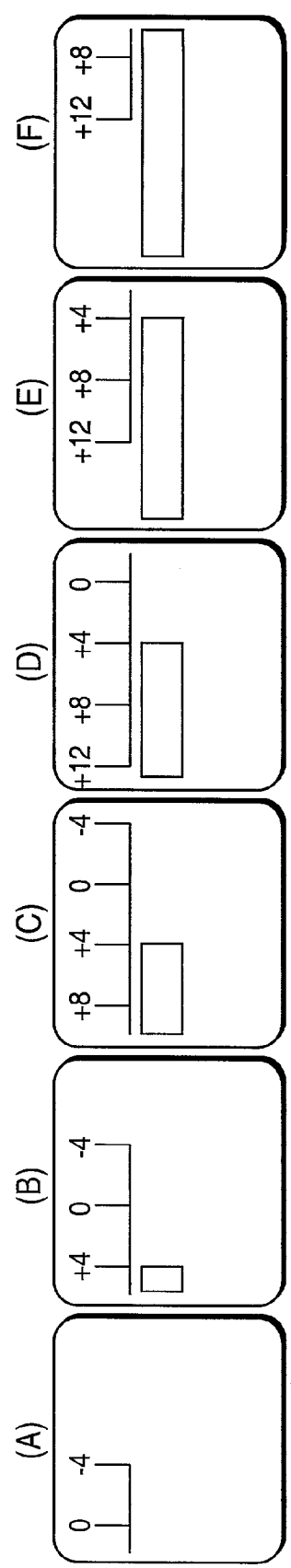
FIGS. 14A–14F show a sequence having a four-frame caption delay.
Figure 15:
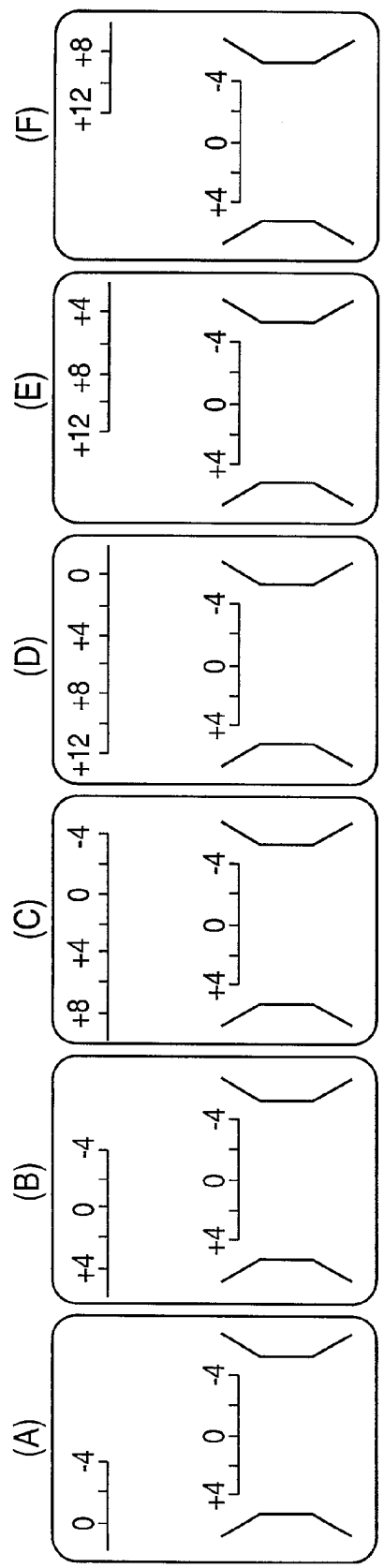
FIGS. 15A–15F show the video pattern according to one embodiment having a static timescale in addition to the scrolling timescale of FIGS. 11A–11F.
Figure 16:
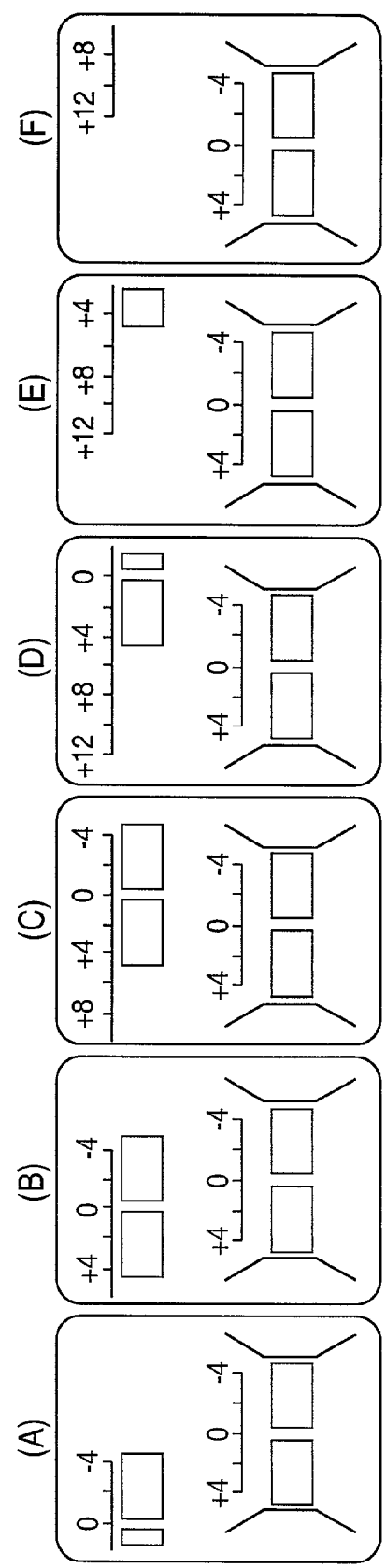
FIGS. 16A–16F show the resulting display pattern when caption processing is synchronized and there is no offset due to over-scan scaling.
Figure 17:
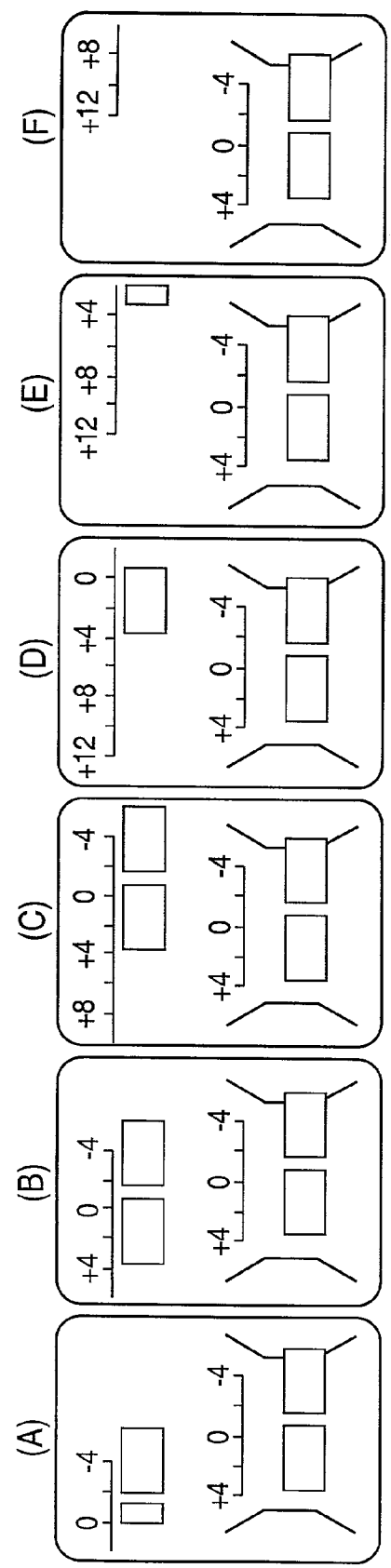
FIGS. 17A–17F show an example of a display pattern with offset due to over-scan scaling.

In a particular implementation of the pop-up and pop-down tests of FIGS. 8–10, the two tests alternate, e.g., changing every 10 seconds. If the decoder is erratic in decoding captions, then the last number visible will not be consistent for iterations of the test. In addition, the pattern may include color coding for synchronization quality. For example, the timescale from −2 to +2 may be colored green to indicate good synchronization, while values less than −2 and greater than +2 may be differently colored to indicate poor synchronization.

Sub-frame measurement may be possible by looking carefully at the brightness of the last number or dot displayed in the pop-up tests, or the first number or dot to be hidden in the pop-down tests. If the number/dot is only visible for one field, it will appear dimmer than normal.

EXAMPLE 3

In an alternative embodiment, the test sequence's caption stream data could include a sequence of commands sent during frame numbers x, x+1, x+2, etc. The command to show a caption window is sent in video frame x, with a series of characters added to that window in frames x+1, x+2, x+3, etc., and a command to hide the caption window in frame x+y. The video (which these captions will overlay) could then be encoded with several (e.g., three) longitudinal stripes. The top stripe would show a video representation of the first caption command on video frame x (and add characters during frames x+1, x+2, etc.), and hide the window on frame x+y. The text is synchronized to the transmission. The second stripe would show a video representation of the caption window starting in frame x+1 and be generally one frame behind the first stripe. The third stripe would be similar, but two frames later than the first stripe.

Evaluation would involve decoding the stream captions and matching a stripe's timing to the caption timing. Since both caption generated text and video signal text look similar, the eye can determine which stripe is most time-coincident. To help, the video display can be videotaped, and watched in slow motion. A computer could also do this evaluation, watching for, for example, the timing of the appearance of a black square (space) at a particular point in the caption text vs. the video text.

Clearly, "text" can be generalized to be any rendered data, and may not be alphabetic. For example, consider a Home Shopping application. Assume that the broadcaster is able to control a receiver using a data channel, and that when a particular sequence is sent on the data channel, a "purchase icon" appears. Assume further that the icon means that the customer can call the broadcaster to purchase the item being displayed. Or, in a similar application, perhaps a symbol appears on the screen allowing the customer to press a button to purchase the decoding key for a movie that is encrypted. This could also be an indicator for a multi-threaded video game.

EXAMPLE 4

Another application could be the time delay between the sending of a new Parental Guidance rating and the blocking of a video program, sent, for example, in ATSC PSIP. In this case, the reference video could include a grid of spaces. These spaces are filled at a rate of one per frame, with a number of milliseconds delay from the time the Parental Guidance rating was sent in PSIP. The observer would watch the video and look for the last grid space to be filled before the program was blocked. The delay would be the value in that grid space. Similar tests could be done with un-blocking a program, directed channel change, aspect ratio change (e.g., sent in the VBI of Japanese NTSC broadcasts), and other situations where information sent in a data channel changes what video is displayed or how it is displayed.

EXAMPLE 5

A different type of testing for caption synchronization can be done using moving text in the video content. In one embodiment, FIGS. 11A–11F show a video pattern in which a timescale scrolls from left to right across the display. Caption synchronization can be tested by including a sequence of caption commands that cause a caption box to appear adjacent to the scrolling video pattern. For example, each frame, a caption character (e.g., a black space) can be added to the right side of the caption box, making a horizontal bar that extends across the screen.

FIGS. 12A–12F show the resulting sequence when caption processing is properly synchronized with the video. In particular, the right side of the caption box is always aligned with the 0 on the scrolling video timescale. FIGS. 13A–13F show a sequence in which the caption processing lags the video by a two-frame delay, while FIGS. 14A–14F show a sequence having a four-frame caption delay.

Because the display may have over-scan, making the background video larger than the display size, the marks on the screen might not follow the caption. In other words, the scale may appear to move faster than the right side of the caption box moves. Further, the centering of the video may be off, causing the scale to be shifted. To increase accuracy of the measurement, reference marks can be included in the video. Static (not changing) caption characters can be placed within these marks (for nominally scaled screens). That will show how much inaccuracy the caption placement has, and the viewer can compensate for the inaccuracy by taking readings at the start and end of the caption line (when it first appears and when it disappears). The average of these readings should be the correct delay value.

FIGS. 15A–15F show the video pattern according to one embodiment. This video pattern has a moving timescale similar to that in FIGS. 11A–11F. In addition, the video pattern of FIGS. 15A–15F has a static timescale with reference marks. Moving and static caption boxes are then added to the bitstream, where the moving caption box should follow the moving timescale, and the static caption box should remain adjacent to the static timescale, centered within the reference marks. FIGS. 16A–16F show the resulting display pattern when caption processing is synchronized and there is no offset due to over-scan scaling. If, however, the right side of the static caption window appears under, e.g., "−2" on the static scale, then the centering is off, and the measurement on the moving scale's value should have 2 added to it. FIGS. 17A–17F show an example of a display pattern with offset due to over-scan scaling.

For EIA 708 captions, the caption box, defined by the DefineWindow command, can be moved each frame, both horizontally and vertically. Boxes can be used to cover the static timescale and/or the moving timescale. Motion can be considerably slower, so measurement can be more accurate. Horizontal positions can be specified as any of 160 values, so a scan can take 160 frames, or over 5 seconds (at 30 fps). The sequence could also be run at 60 fps, making a smoother scrolling, and more accuracy. Since the delay for 60-fps video might not be the same as 30-fps video, testing this difference may be done using a stream that alternates frame rates (either using the sequence header or the picture structure).

The exact size of caption boxes in EIA 708 captions is not specified, but one edge, or one corner's position is. The scale and offset markers can be used to determine caption position, even if it is not combined with the delay test.

Scale can also be evaluated by specifying boxes with different anchor points, and nominal alignment. When the box scales are nominal, they appear lined up one below the other. If the boxes are bigger than nominal, the ones below (say with left anchor points) appear to the right of the line, and those above, say with right anchor points, appear to the left. A scale could help calibrate the measurement.

Broadening

Although the present invention has been described in the context of bitstreams, the invention can also be implemented in the context of other types of data structures, including those in which the video and closed caption content is encoded in different data streams. Depending on the implementation, bitstreams corresponding to the present invention could be generated off-line and distributed pre-recorded, e.g., on CD-ROMs. Alternatively, the bitstreams could be generated on-the-fly (i.e., in real time) by a test signal generator. Whether generated ahead of time or in real time, bitstreams could also be distributed over a network, e.g., over the Internet on a subscription-type basis.

Although the present invention has been described primarily in the context of testing closed captioning for digital television (DTVCC), embodiments of the present invention may also be applied to testing closed captioning for analog television and possibly to the testing of other signal processing equipment. In general, the system under test might be an ATSC receiver or decoder, a cable set-top box, a computer, or other suitable device receiving video and closed caption data streams. The different data streams could be stored together, as in an ATSC test bitstream, or generated with a particular time relationship, as in out-of-band control for a cable television decoder box.

Although the present invention has been described in the context of MPEG encoding, those skilled in the art will understand that the present invention can be applied in the context of other video compression algorithms.

Similarly, although the present invention has been described in the context of a video frame or pictures as a single entity, those skilled in the art will understand that the invention can also be applied in the context of interlaced video streams and associated field processing. As such, unless clearly inappropriate for the particular implementation described, the term "frame," especially as used in the claims, should be interpreted to cover applications for both video frames and video fields.

Although the present invention has been described primarily in the context of testing captioning on MPEG or NTSC video, it can be used to test other combinations of display information and auxiliary information. For example, the display information may include other representations of a sequence of images, such as an MPEG-4 video stream, animated GIF format images, vector graphics image sequences, or other methods of creating synthetic or recreating captured video information.

Auxiliary information is information that modifies the user's experience of the image sequence, it can be closed captions, but it can also be other information that controls, modifies, or overlays the video information. For example, the same techniques used to time caption synchronization can be used to time EIA-608-B defined XDS Content Advisory (v-chip) data, showing the delay from reception of a program rating value to the time the display is disabled, and visa-versa. The video inset window might be used to show the effect of a signal that causes the aspect ratio of the displayed video to go between "Widescreen" and "NTSC format."

Auxiliary information (a) may be sent within the video signal, as in the captions sent in line 21 of an NTSC video signal, (b) may be sent along with the video, as in Content Advisory information sent in an independent stream (e.g., PSIP) within the ATSC transport stream, or (c) may arrive at the device under test by another route, as in caption insertion hardware which works with a captioning file stored on the insertion hardware and an input NTSC video signal, synchronized by SMPTE timecode (such as the DV2000 VBI Encoder/Character Generator made by Ultech Corp. of Middlebury, Conn.).

The present invention may be implemented as circuit-based processes, including possible implementation on a single integrated circuit. As would be apparent to one skilled in the art, various functions of circuit elements may also be implemented as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. Apparatus for providing a data structure for testing auxiliary information processing of a decoder, wherein the apparatus comprises:
   (a) means for providing a video stream comprising a coded representation of a picture; and
   (b) means for providing an auxiliary information stream comprising a coded representation of auxiliary information for the picture, wherein:
   the coded representation of the picture comprises an inset window representative of a reduced version of the picture properly overlaid by the auxiliary information; and
   the reduced version of the picture includes a representation of the inset window.

2. The invention of claim 1, wherein the data structure is a digital television (DTV) signal and the auxiliary information stream is a closed caption stream within the DTV signal.

3. The invention of claim 1, wherein the inset window accurately represents position, color, font, and characters of the auxiliary information in the picture.

4. The invention of claim 1, wherein:
   the data structure comprises two or more auxiliary information streams, each comprising a coded representation of auxiliary information for the picture; and
   the picture is used to independently test the auxiliary information processing of each of the auxiliary information streams.

5. The invention of claim 4, wherein the picture includes a general description of the two or more auxiliary information streams.

6. The invention of claim 1, wherein:
the picture contains hidden video content corresponding in location to the proper location of the auxiliary information;
the hidden video content is completely overlaid in the picture by the auxiliary information, if the decoder properly processes the auxiliary information stream;
at least a portion of the hidden video content is visible in the picture, if the decoder improperly processes the auxiliary information stream; and
the appearance of the hidden video content differs from the appearance of video content in the picture adjacent to the hidden video content to enable a viewer to detect the improper processing of the auxiliary information based on the appearance difference between the hidden video content and the adjacent video content.

7. A method for generating a data structure to be used for testing auxiliary information processing of a decoder, the method comprising the steps of:
(1) receiving information for the data structure; and
(2) generating the data structure from the information, wherein the data structure comprises:
(a) a video stream comprising a coded representation of a picture; and
(b) an auxiliary information stream comprising a coded representation of auxiliary information for the picture, wherein:
the coded representation of the picture comprises an inset window representative of a reduced version of the picture properly overlaid by the auxiliary information; and
the reduced version of the picture includes a representation of the inset window.

8. The invention of claim 7, wherein:
the picture contains hidden video content corresponding in location to the proper location of the auxiliary information;
the hidden video content is completely overlaid in the picture by the auxiliary information, if the decoder properly processes the auxiliary information stream;
at least a portion of the hidden video content is visible in the picture, if the decoder improperly processes the auxiliary information stream; and
the appearance of the hidden video content differs from the appearance of video content in the picture adjacent to the hidden video content to enable a viewer to detect the improper processing of the auxiliary information based on the appearance difference between the hidden video content and the adjacent video content.

9. The invention of claim 7, wherein the data structure is a digital television (DTV) signal and the auxiliary information stream is a closed caption stream within the DTV signal.

10. The invention of claim 7, wherein the inset window accurately represents position, color, font, and characters of the auxiliary information in the picture.

11. The invention of claim 7, wherein:
the data structure comprises two or more auxiliary information streams, each comprising a coded representation of auxiliary information for the picture; and
the picture is used to independently test the auxiliary information processing of each of the auxiliary information streams.

12. The invention of claim 11, wherein the picture includes a general description of the two or more auxiliary information streams.

13. Apparatus for providing a data structure for testing auxiliary information processing of a decoder, wherein the apparatus comprises:
(a) means for providing a video stream comprising a coded representation of a picture; and
(b) means for providing two or more auxiliary information streams, each comprising a coded representation of auxiliary information for the picture, wherein:
the picture is used to independently test the auxiliary information processing of each of the auxiliary information streams; and
the picture includes a general description of the two or more auxiliary information streams.

14. The invention of claim 13, wherein the data structure is a digital television (DTV) signal and the auxiliary information stream is a closed caption stream within the DTV signal.

15. A method for generating a data structure to be used for testing auxiliary information processing of a decoder, the method comprising the steps of:
(1) receiving information for the data structure; and
(2) generating the data structure from the information, wherein the data structure comprises:
(a) a video stream comprising a coded representation of a picture; and
(b) two or more auxiliary information streams, each comprising a coded representation of auxiliary information for the picture, wherein:
the picture is used to independently test the auxiliary information processing of each of the auxiliary information streams; and
the picture includes a general description of the two or more auxiliary information streams.

16. The invention of claim 15, wherein the data structure is a digital television (DTV) signal and the auxiliary information stream is a closed caption stream within the DTV signal.

17. Apparatus for providing a data structure for testing auxiliary information processing of a decoder, wherein the apparatus comprises:
(a) means for providing a video stream comprising a coded representation of a picture; and
(b) means for providing an auxiliary information stream comprising a coded representation of auxiliary information for the picture, wherein:
the picture comprises an inset window representative of a reduced version of the picture properly overlaid by the auxiliary information;
the data structure comprises two or more auxiliary information streams, each comprising a coded representation of auxiliary information for the picture; and
the picture is used to independently test the auxiliary information processing of each of the auxiliary information streams.

18. The invention of claim 17, wherein the picture includes a general description of the two or more auxiliary information streams.

19. A method for generating a data structure to be used for testing auxiliary information processing of a decoder, the method comprising the steps of:
(1) receiving information for the data structure; and
(2) generating the data structure from the information, wherein the data structure comprises:
(a) a video stream comprising a coded representation of a picture; and (b) an auxiliary information stream comprising a coded representation of auxiliary information for the picture, wherein:

the picture comprises an inset window representative of a reduced version of the picture properly overlaid by the auxiliary information;

the data structure comprises two or more auxiliary information streams, each comprising a coded representation of auxiliary information for the picture; and the picture is used to independently test the auxiliary information processing of each of the auxiliary information streams.

20. The invention of claim 19, wherein the picture includes a general description of the two or more auxiliary information streams.

21. Apparatus for providing a data structure for testing auxiliary information processing of a decoder, wherein the apparatus comprises:

(a) means for providing a video stream comprising a coded representation of a picture; and (b) means for providing an auxiliary information stream comprising a coded representation of auxiliary information for the picture, wherein:

the coded representation of the picture comprises an inset window representative of a reduced version of the picture properly overlaid by the auxiliary information;

the picture contains hidden video content corresponding in location to the proper location of the auxiliary information;

the hidden video content is completely overlaid in the picture by the auxiliary information, if the decoder properly processes the auxiliary information stream;

at least a portion of the hidden video content is visible in the picture, if the decoder improperly processes the auxiliary information stream; and the appearance of the hidden video content differs from the appearance of video content in the picture adjacent to the hidden video content to enable a viewer to detect the improper processing of the auxiliary information based on the appearance difference between the hidden video content and the adjacent video content.

22. A method for generating a data structure to be used for testing auxiliary information processing of a decoder, the method comprising the steps of:

(1) receiving information for the data structure; and (2) generating the data structure from the information, wherein the data structure comprises:

(a) a video stream comprising a coded representation of a picture; and (b) an auxiliary information stream comprising a coded representation of auxiliary information for the picture, wherein:

the coded representation of the picture comprises an inset window representative of a reduced version of the picture properly overlaid by the auxiliary information;

the picture contains hidden video content corresponding in location to the proper location of the auxiliary information;

the hidden video content is completely overlaid in the picture by the auxiliary information, if the decoder properly processes the auxiliary information stream;

at least a portion of the hidden video content is visible in the picture, if the decoder improperly processes the auxiliary information stream; and the appearance of the hidden video content differs from the appearance of video content in the picture adjacent to the hidden video content to enable a viewer to detect the improper processing of the auxiliary information based on the appearance difference between the hidden video content and the adjacent video content.

* * * * *